United States Patent
Miyashita et al.

(10) Patent No.: US 8,565,054 B2
(45) Date of Patent: Oct. 22, 2013

(54) OPTICAL RECORDING MEDIUM, OPTICAL RECORDING MEDIUM MANUFACTURING METHOD, REPRODUCTION SIGNAL PROCESSING METHOD AND EVALUATION METHOD

(75) Inventors: Harumitsu Miyashita, Nara (JP); Yasumori Hino, Nara (JP); Mamoru Shoji, Osaka (JP); Kiyotaka Itou, Osaka (JP)

(73) Assignee: Panasonic Corporation, Osaka (JP)

( * ) Notice: Subject to any disclaimer, the term of this patent is extended or adjusted under 35 U.S.C. 154(b) by 1296 days.

(21) Appl. No.: 12/376,544

(22) PCT Filed: Nov. 30, 2007

(86) PCT No.: PCT/JP2007/073191
§ 371 (c)(1),
(2), (4) Date: Feb. 5, 2009

(87) PCT Pub. No.: WO2008/078506
PCT Pub. Date: Jul. 3, 2008

(65) Prior Publication Data
US 2010/0202261 A1    Aug. 12, 2010

(30) Foreign Application Priority Data
Dec. 26, 2006 (JP) .................. 2006-349553

(51) Int. Cl.
*G11B 5/09* (2006.01)
*G11B 7/24* (2013.01)
*G11B 20/18* (2006.01)
*G11B 3/70* (2006.01)
*G11B 3/74* (2006.01)

(52) U.S. Cl.
USPC .................. 369/47.15; 369/275.4; 369/53.24; 369/283; 369/94

(58) Field of Classification Search
USPC ......................... 369/283, 94, 53.24
See application file for complete search history.

(56) References Cited

U.S. PATENT DOCUMENTS

| 5,604,724 A | 2/1997 | Shiokawa |
| 6,240,055 B1 * | 5/2001 | Takamine et al. .......... 369/44.29 |
| 7,339,872 B2 | 3/2008 | Ogura |

(Continued)

FOREIGN PATENT DOCUMENTS

| EP | 1 580 735 | 9/2005 |
| EP | 1 811 514 | 7/2007 |

(Continued)

OTHER PUBLICATIONS

Supplementary Partial European Search Report issued Feb. 3, 2011 in Application No. EP 07 85 9699.

(Continued)

*Primary Examiner* — Aneeta Yodichkas
(74) *Attorney, Agent, or Firm* — Wenderoth, Lind & Ponack, L.L.P.

(57) ABSTRACT

An optical head 12 reproduces information recorded on an optical disc 11, a BCA detector 21 and a medium discriminating circuit 22 acquire waveform distortion information for specifying a waveform distortion of a reproduction signal reproduced by the optical head 12, and a variable waveform equalizer 16 changes a parameter used in a distortion reduction processing for reducing the waveform distortion of the reproduction signal based on the waveform distortion information.

6 Claims, 10 Drawing Sheets

(56) References Cited

U.S. PATENT DOCUMENTS

| | | | |
|---|---|---|---|
| 2002/0024900 A1* | 2/2002 | Nakane et al. | 369/47.17 |
| 2002/0044506 A1* | 4/2002 | Shihara et al. | 369/44.32 |
| 2002/0051416 A1 | 5/2002 | Suzuki | |
| 2002/0141317 A1 | 10/2002 | Minamino et al. | |
| 2002/0145947 A1 | 10/2002 | Minamino et al. | |
| 2002/0163866 A1 | 11/2002 | Minamino et al. | |
| 2003/0007432 A1 | 1/2003 | Minamino et al. | |
| 2003/0016606 A1* | 1/2003 | Urita et al. | 369/47.26 |
| 2003/0043718 A1 | 3/2003 | Minamino et al. | |
| 2004/0001410 A1* | 1/2004 | Yonezawa | 369/53.24 |
| 2005/0063276 A1 | 3/2005 | Ogura | |
| 2005/0105459 A1 | 5/2005 | Tamura | |
| 2005/0219985 A1 | 10/2005 | Nakahira | |
| 2006/0203631 A1* | 9/2006 | Wu et al. | 369/44.26 |
| 2007/0104059 A1* | 5/2007 | Nakatani et al. | 369/47.53 |
| 2007/0286061 A1 | 12/2007 | Katamaya et al. | |
| 2009/0086589 A1 | 4/2009 | Minamino et al. | |
| 2009/0086614 A1 | 4/2009 | Minamino et al. | |

FOREIGN PATENT DOCUMENTS

| | | |
|---|---|---|
| JP | 8-153370 | 6/1996 |
| JP | 11-328858 | 11/1999 |
| JP | 2002-230904 | 8/2002 |
| JP | 2005-93033 | 4/2005 |
| RU | 2 284 588 | 10/2004 |
| WO | 2006/006458 | 1/2006 |
| WO | 2006/043526 | 4/2006 |
| WO | 2006/049006 | 5/2006 |

OTHER PUBLICATIONS

"White Paper: Blu-ray Disc Recordable Format. Part 1: Physical Specifications", Internet Citation, Feb. 1, 2006, p. 33PP, retrieved from the Internet: URL:http://www.blu-raydisc.com/Assets/Downloadablefile/BD-R_Physical_3rd_edition_0602f1-15268.pdf [retrieved on Feb. 25, 2010].

Hiroshi Nishiwaki et al., "Organic Dye 25 GB Write-Once Disk with In-Groove Structure", Japanese Journal of Applied Physics, Japan Society of Applied Physics, JP, vol. 45, No. 2B, Jan. 1, 2006, pp. 1452-1455.

International Search Report issued Feb. 5, 2008 in the International (PCT) Application No. PCT/JP2007/073191.

Extended European Search Report mailed Jul. 30, 2012 in corresponding European Application No. 12172746.5.

* cited by examiner

OPTICAL RECORDING MEDIUM, OPTICAL RECORDING MEDIUM MANUFACTURING METHOD, REPRODUCTION SIGNAL PROCESSING METHOD AND EVALUATION METHOD

TECHNOLOGICAL FIELD

The present invention relates to an optical recording medium to which a signal processing relating to a waveform distortion of a reproduction signal is to be performed, a manufacturing method, a reproduction signal processing method and an evaluation method thereof.

BACKGROUND ART

Research and development on high-density optical discs have been actively carried out in recent years, DVDs have been recently generally used and optical discs are establishing a position as important information recording media. In DVDs, a method for demodulating digital data by a digital signal processing using PRML (Partial Response Maximum Likelihood) effective for high density recording and reproduction in a linear direction has been brought in to improve the reproduction quality of media capable of high-density recording.

On the other hand, for a reproduction signal reproduced from a DVD having incompletely shaped marks recorded due to a recording performance and the like, reproduction quality may be degraded in the PRML signal processing as compared with a level discrimination binary processing for binary discrimination using a slice level at which a balance of recorded codes is satisfied.

Thus, an optical disc device for measuring a mark distortion rate for a mark pattern with a long recording width in a DVD and switching a signal processing between a PRML signal processing and a level discrimination binary processing based on the mark distortion rate is disclosed, for example, in patent literature 1. In this optical disc device, reproduction quality unaffected by mark distortion can be obtained in the reproduction of a DVD. Further, patent literature 2 discloses to satisfactorily reproduce information from an optical disc having information recorded at high density using two types of waveform equalizing circuits having different equalization characteristics.

BDs (Blu-ray Discs) such as BD-Rs (Blu-ray Disc Recordables) formed with organic dye recording films by spin coating and BD-REs (Blu-ray Disc Rewritables) formed with recording films made of phase-change materials by deposition have been proposed and put to practical use as a tendency toward higher density. Out of these BDs, those formed with organic dye recording films by spin coating easily enable a cost reduction, wherefore they are predicted to enter the mainstream of inexpensive high-density optical recording media.

FIG. 12 is a diagram showing the structure of a BD formed with an organic dye recording film by spin coating. In the BD shown in FIG. 12, a reflection film 53 is formed on an injection molded substrate 54 by sputtering or the like, an organic dye recording layer 52 is formed on the reflection film 53 by spin coating and a transparent film 51 is formed on the recording layer 52. This BD has a groove track (on-groove) OG and a land track (in-groove) IG, and a laser beam 50 is irradiated to the recording layer 52 via the transparent layer 51 to record information on the land track IG (see, for example, patent literature 3).

The BD shown in FIG. 12 has no HtoL characteristic in which the reflectance of a recorded area is lower than that of an unrecorded area, but has an LtoH characteristic in which the reflectance of a recorded area is higher than that of an unrecorded area. In order to ensure a sufficient reflectance, the depth of a track groove (difference between the height of the groove track OG and that of the land track IG) is set to be smaller than the one in an optical recording medium having an HtoL characteristic (see, for example, patent literature 4).

As described above, in the BD having the LtoH characteristic in which the reflectance of the recorded area is higher than that of the unrecorded area and having information recorded on the land track, the depth of the track groove is small, wherefore heat is easily trapped and very unbalanced recording is likely to be performed as compared to BDs with other combinations (BD having the LtoH characteristic and having information recorded on a groove track, BD having the HtoL characteristic and having information recorded on the groove track or the land track). Thus, tear-shaped or M-shaped marks (recorded areas) as described below are more likely to be recorded, thereby degrading the recording quality.

FIG. 13 is a diagram showing an example of the tear-shaped mark and FIG. 14 is a diagram showing an example of the M-shaped mark. Upon reproducing the tear-shaped mark MD shown in FIG. 13, a reproduction signal SD has a large amplitude in the front half, but has a small amplitude in the rear half. Upon reproducing the M-shaped mark MM shown in FIG. 14, a reproduction signal SB has a large amplitude at a front side, has a small amplitude in the middle and has a large amplitude again at a rear side.

Since a shortest recording mark is very small and subject to intersymbol interference during reproduction in a BD, reproduction by the level discrimination binary processing is difficult. As a result, the level discrimination binary processing used in DVDs cannot be used and the PRML signal processing needs to be used. However, in the above BD having the LtoH characteristic and having information recorded on the land track, a signal with a very large waveform distortion is reproduced as compared with other BDs. Thus, errors frequently occur and signals with good reproduction quality cannot be obtained if the conventional PRML signal processing, which cannot deliver sufficient performance to a reproduction signal with a large waveform distortion, is used as it is.

Patent Literature 1:
Japanese Unexamined Patent Publication No. 2005-93033
Patent Literature 2:
Japanese Unexamined Patent Publication No. 2002-230904
Patent Literature 3:
A1 Pamphlet of International Publication WO 2006/006458
Patent Literature 4:
A1 Pamphlet of International Publication WO 2006/049006

DISCLOSURE OF THE INVENTION

An object of the present invention is to provide an optical recording medium to which a signal processing relating to a waveform distortion can be satisfactorily performed even to a reproduction signal with a large waveform distortion, a manufacturing method, a reproduction signal processing method and an evaluation method of such an optical recording medium.

One aspect of the present invention is directed to an optical recording medium in which information is recorded on a land track or a groove track and the reflectance of a recorded area is lower than that of an unrecorded area, wherein a signal processing relating to a waveform distortion of a reproduction signal reproduced from the optical recording medium is adjusted by changing a parameter used in the signal processing based on waveform distortion information for specifying the waveform distortion of the reproduction signal and the parameter is changed to emphasize high-frequency components of the reproduction signal more than in a signal processing relating to a waveform distortion of a reproduction signal reproduced from an optical recording medium in which the reflectance of a recorded area is higher than that of an unrecorded area.

In this optical recording medium, the parameter used in the signal processing relating to the waveform distortion of the reproduction signal being reproduced is changed to emphasize the high-frequency components of the reproduction signal more than in the signal processing relating to the waveform distortion of the reproduction signal reproduced from the optical recording medium in which the reflectance of the recorded area is higher than that of the unrecorded area. Thus, the quality of a high-frequency signal can be improved and the signal processing relating to the waveform distortion can be satisfactorily performed even to a reproduction signal having a large waveform distortion.

BEST MODES FOR EMBODYING THE INVENTION

Hereinafter, embodiments of the present invention are described in detail with reference to the drawings.

First Embodiment

Figure 1:
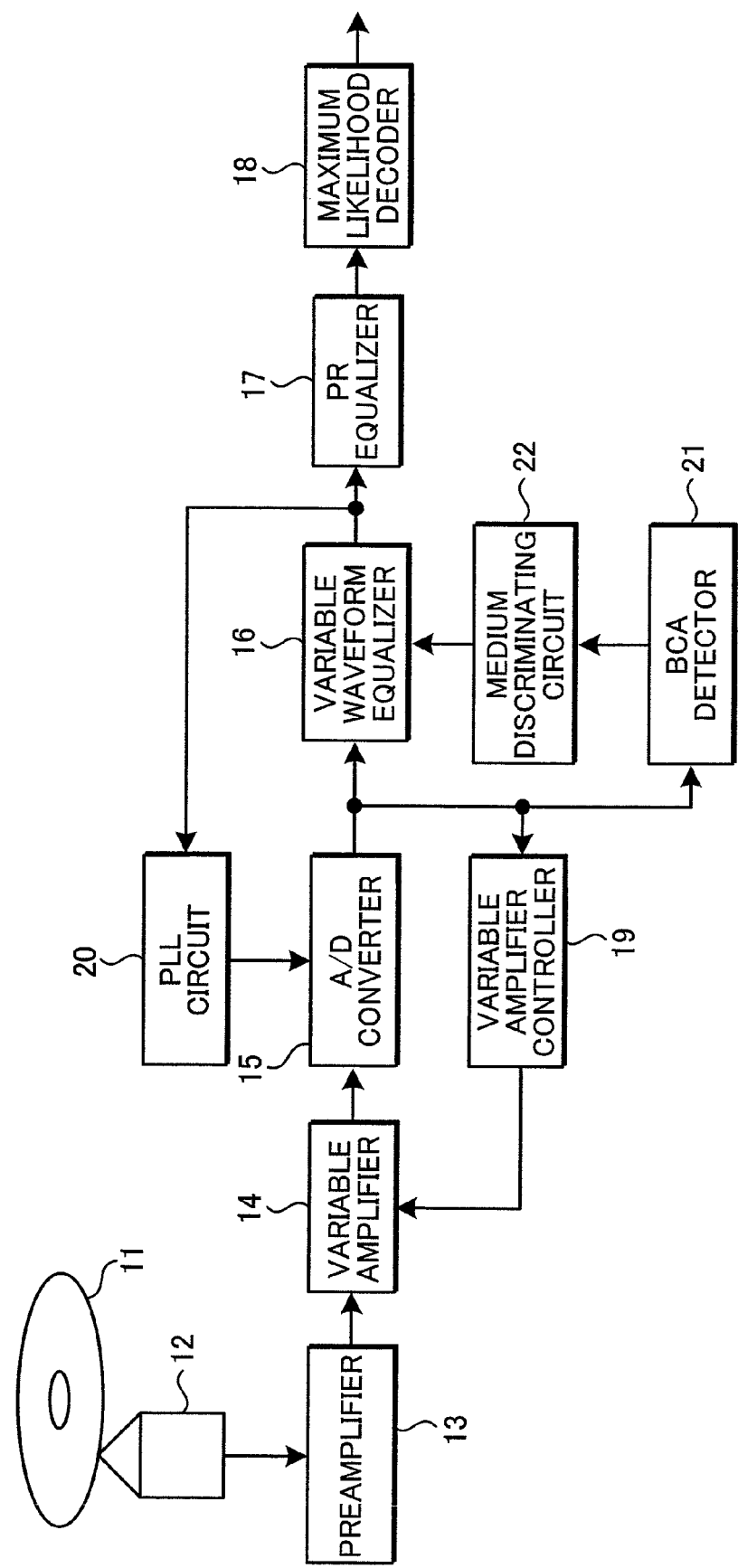
FIG. 1 is a block diagram showing the construction of an optical disc device according to a first embodiment of the invention.

First of all, an optical disc device as an example of an information reproducing device according to a first embodiment of the present invention is described. FIG. 1 is a block diagram showing the construction of the optical disc device according to the first embodiment of the invention.

The optical disc device shown in FIG. 1 is provided with an optical head 12, a preamplifier 13, a variable amplifier 14, an A/D (analog-to-digital) converter 15, a variable waveform equalizer 16, a PR (Partial Response) equalizer 17, a maximum likelihood decoder 18, a variable amplifier controller 19, a PLL (Phase Locked Loop) circuit 20, a BCA (Burst Cutting Area) detector 21 and a medium discriminating circuit 22.

The optical disc device shown in FIG. 1 can reproduce information at least from a BD having a characteristic in which the reflectance of a recorded area is higher than that of an unrecorded area (hereinafter, "LtoH characteristic") and recorded with information on a land track (hereinafter, "in-groove recording") as an optical disc 11 and can also reproduce information from a BD having the LtoH characteristic and recorded with information on a groove track (hereinafter, "on-groove recording"), a BD with a characteristic in which the reflectance of a recorded area is lower than that of an unrecorded area (hereinafter, "HtoL characteristic") and with the in-groove recording and a BD with the HtoL characteristic and with the on-groove recorded if necessary.

The optical head 12 includes a semiconductor laser, an objective lens, an actuator and the like, irradiates a laser beam to the optical disc 11 to reproduce the recorded information and outputs a reproduction signal to the preamplifier 13. The preamplifier 13 amplifies the reproduction signal with a specified gain and outputs it to the variable amplifier 14.

The variable amplifier 14 and the variable amplifier controller 19 constitute an AGC (Automatic Gain Controller), wherein the variable amplifier 14 amplifies the reproduction signal from the preamplifier 13 under the control of the variable amplifier controller 19 such that the level of the reproduction signal outputted from the variable waveform equalizer 16 becomes a fixed level using a target gain set beforehand and outputs it to the A/D converter 15.

The PLL circuit 20 generates a reproduction clock which synchronizes with the reproduction signal after waveform equalization to be described later and outputs it to the A/D converter 15. The A/D converter 15 converts the analog reproduction signal into a digital reproduction signal by sampling the reproduction signal in synchronism with the reproduction clock outputted from the PLL circuit 20, and outputs it to the variable waveform equalizer 16, the variable amplifier controller 19 and the BCA detector 21. The variable amplifier controller 19 detects the level of the digital signal and automatically adjusts the gain of the variable amplifier 14 such that the level of the reproduction signal outputted from the variable waveform equalizer 16 becomes the fixed level.

The variable waveform equalizer 16 is so constructed as to be able to change a gain used for a waveform equalization processing in addition to a normal construction of a linear waveform equalizer and has a filter characteristic for amplifying a high-frequency range of the reproduction signal. The variable waveform equalizer 16 shapes the waveform of the reproduction signal outputted from the A/D converter 15 using a gain instructed by the medium discriminating circuit 22 and outputs the resulting reproduction signal to the PR equalizer 17 and the PLL circuit 20. The waveform equalizer is not particularly limited to a waveform equalizer for performing a digital processing, and a waveform equalizer for performing waveform equalization by an analog processing may be arranged between the variable amplifier 14 and the A/D converter 15. This also holds for waveform equalizers of other embodiments to be describe later.

The PR equalizer 17 has a frequency characteristic set such that the frequency characteristic of a recording/reproducing system comes to have a characteristic (e.g. PR(1, 2, 2, 1) equalization characteristic) supposed by the maximum likelihood decoder 18, performs a PR equalization processing for suppressing high band noise and intentionally adding intersymbol interference to the reproduction signal and outputs the resulting reproduction signal to the maximum likelihood decoder 18. The maximum likelihood decoder 18 is a Viterbi decoder and decodes the reproduction signal after the PR(1, 2, 2, 1) equalization by a maximum likelihood method for estimating a most probable sequence in accordance with a symbolic rule intentionally added according to a partial response type and outputs binary data. This binary data is outputted as a decoded binary signal to a circuit (not shown) at a later stage, where a specified processing is performed to reproduce the information recorded on the optical disc 11.

The optical disc 11 includes a BCA area, a control data area and a data recording area successively from an inner circumferential side. The control data area is an area where management information and the like are prerecorded, and the data recording area is an area where data are recorded by a user. Further, the BCA area is an area for recording information for more detailed classification for optical discs having the same content recorded in the control data area. Information recording in this BCA area is performed by recording a barcode at a factory after the disc is manufactured. This recording can be performed, for example, by the same principle as the one of recording information in the data recording area, or by utilizing a characteristic change of a film or by partially removing the film by trimming.

In this embodiment, a track code (see, for example, A1 Pamphlet of International Publication WO 2006/006458) indicating to which of the groove track and the land track a tracking servo is performed and a characteristic code (see, for example, A1 Pamphlet of International Publication WO 2006/049006) indicating which of the LtoH characteristic and the HtoL characteristic is possessed are prerecorded as an example of waveform distortion information or medium specifying information in the BCA area of the optical disc 11. The recording area of the track code and the characteristic code is not particularly limited to the BCA area, and the track code and the characteristic code may be recorded in another area such as the control data area. Alternatively, the same track code and characteristic code may be recorded in two or more areas or the respective codes may be recorded in different areas. In this way, recording modes can be variously changed. Further, the track code and the characteristic code are not particularly limited to the above examples, and various other pieces of information can be used provided that such information can discriminate an optical recording medium with the LtoH characteristic and the in-groove recording from other optical recording media.

The BCA detector 21 detects the track code and the characteristic code from the reproduction signal digitized by the A/D converter 15 and outputs them to the medium discriminating circuit 22. The medium discriminating circuit 22 discriminates whether the optical disc 11 is a BD with the LtoH characteristic and the in-groove recording, a BD with the LtoH characteristic and the on-groove recording, a BD with the HtoL characteristic and the in-groove recording or a BD with the HtoL characteristic and the on-groove recording based on the track code and the characteristic code and controls the variable waveform equalizer 16 to reduce the gain used for the waveform equalization processing if the optical disc 11 is the BD with the LtoH characteristic and the in-groove recording while controlling the variable waveform equalizer 16 to maintain a normal gain (increase to an initial gain if the gain was already reduced) in the case of other BDs.

In this embodiment, the optical head 12 corresponds to an example of an optical head, the BCA detector 21 and the medium discriminating circuit 22 correspond to an example of an acquiring unit, and the variable waveform equalizer 16 corresponds to an example of a distortion reducing unit.

Next, the operation of the optical disc device constructed as above is described. If the optical disc 11 is loaded into the optical disc device, the optical head 12 accesses to the BCA area, the BCA detector 21 detects the track code and the characteristic code of the optical disc 11 from a reproduction signal, and the medium discriminating circuit 22 discriminates whether or not the optical disc 11 is a BD with the LtoH characteristic and the in-groove recording based on the detected track code and the characteristic code.

Unless the optical disc 11 is a BD with the LtoH characteristic and the in-groove recording, the medium discriminating circuit 22 instructs the variable waveform equalizer 16 to maintain the normal gain, the variable waveform equalizer 16 performs the waveform equalization processing to amplify a high-frequency range of the reproduction signal, and the PR equalizer 17 and the maximum likelihood decoder 18 perform the PRML signal processing to the reproduction signal after the normal waveform equalization processing and outputs a decoded binary signal with good reproduction quality.

Figure 13:
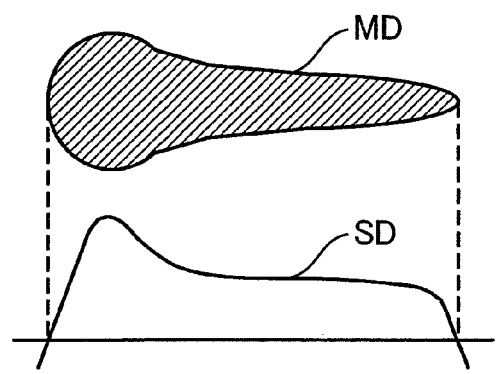
FIG. 13 is a diagram showing an example of a tear-shaped mark.
Figure 14:
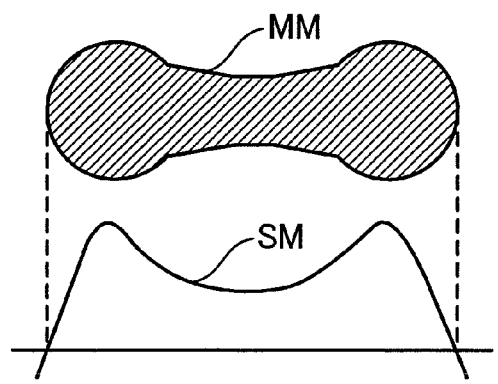
FIG. 14 is a diagram showing an example of an M-shaped mark.

On the other hand, if the optical disc 11 is a BD with the LtoH characteristic and the in-groove recording, the medium discriminating circuit 22 instructs the variable waveform equalizer 16 to reduce the gain by several dB from the normal gain and the variable waveform equalizer 16 performs the waveform equalization processing to the reproduction signal by reducing the gain used for the waveform equalization processing. In this case, even if a tear-shaped or M-shaped mark as shown in FIGS. 13 and 14 is recorded, the waveform distortion of the reproduction signal is reduced by the variable waveform equalizer 16 and a suitable PRML signal processing is performed to the reproduction signal after the waveform equalization processing and a decoded binary signal with good reproduction quality can be obtained in the PR equalizer 17 and the maximum likelihood decoder 18.

By the above process, stable reproduction quality can be obtained without being influenced by recording quality in this embodiment even if the PRML signal processing is performed to a reproduction signal having a large waveform distortion from an optical disc with poor recording quality like a BD with the LtoH characteristic and the in-groove recording.

Second Embodiment

Figure 2:
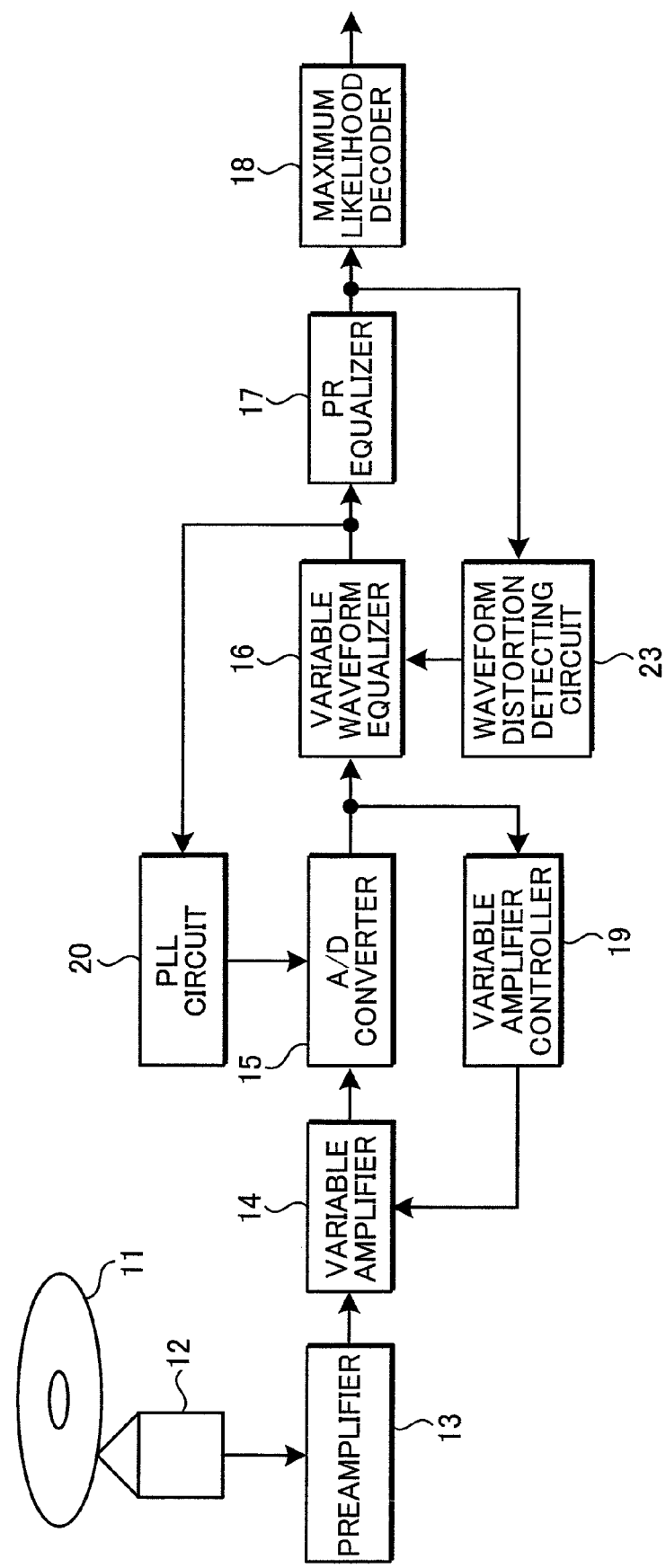
FIG. 2 is a block diagram showing the construction of an optical disc device according to a second embodiment of the invention.

Next, an optical disc device according to a second embodiment of the present invention is described. FIG. 2 is a block diagram showing the construction of the optical disc device according to the second embodiment of the present invention. The optical disc device shown in FIG. 2 differs from the one shown in FIG. 1 in that a waveform distortion detecting circuit 23 is added in place of the BCA detector 21 and the medium discriminating circuit 22. Since the optical disc device shown in FIG. 2 is similar to the one shown in FIG. 1 in other points, same parts are identified by same reference numerals and not described in detail. Only different points are described in detail below.

A variable waveform equalizer 16 shapes the waveform of a reproduction signal outputted from an A/D converter 15 using a gain instructed by the waveform distortion detecting circuit 23 and outputs the resulting reproduction signal to a PR equalizer 17 and a PLL circuit 20, and the PR equalizer 17 performs a PR equalization processing for suppressing high band noise and intentionally adding intersymbol interference to the reproduction signal after the waveform equalization and outputs the resulting reproduction signal to the maximum likelihood decoder 18 and the waveform distortion detecting circuit 23.

The waveform distortion detecting circuit 23 detects a waveform distortion from the reproduction signal after the PR equalization processing and controls the variable waveform equalizer 16 to reduce a gain used for the waveform equalization processing if the waveform distortion is a specified reference value (e.g. value capable of specifying that the reproduction signal from the optical disc 11 is a reproduction signal from a BD with the LtoH characteristic and the in-groove recording) or larger while controlling the variable waveform equalizer 16 to maintain a normal gain (increases to an initial gain if the gain was already reduced) if the waveform distortion is below the specified value.

Various known detection methods can be used as a waveform distortion detection method in the waveform distortion detecting circuit 23. For example, a waveform distortion detection method disclosed in Japanese Unexamined Patent Publication No. 2005-93033 can be used. The reference value of the waveform distortion detecting circuit 23 is not particularly limited to the above example. The gain can be variously changed, for example, by being reduced in the case of a waveform distortion equal to or larger than a specified value, by being reduced step by step based on a plurality of reference values, or by proportionally or exponentially changing, a reduction amount of the gain according to an increased amount of distortion. In this embodiment, the waveform distortion detecting circuit 23 corresponds to an example of the acquiring unit. This embodiment is similar to the first embodiment in other points.

Next, the operation of the optical disc device constructed as above is described. If the optical disc 11 is loaded into the optical disc device, an optical head 12 accesses to a specified area, e.g. a control data area, and the waveform distortion detecting circuit 23 detects a waveform distortion of a reproduction signal of the optical disc 11 and discriminates whether or not the waveform distortion is equal to or larger than the specified reference value.

If the waveform distortion is smaller than the specified reference value, the waveform distortion detecting circuit 23 instructs the variable waveform equalizer 16 to maintain the normal gain, the variable waveform equalizer 16 performs the waveform equalization processing to the reproduction signal to amplify a high-frequency range of the reproduction signal using the normal gain, and the PR equalizer 17 and the maximum likelihood decoder 18 perform a PRML signal processing to the reproduction signal after the normal waveform equalization processing and output a decoded binary signal with good reproduction quality.

On the other hand, if the waveform distortion is equal to or larger than the specified reference value, the variable waveform equalizer 16 instructs the variable waveform equalizer 16 to reduce the gain by several dB from the normal gain and the variable waveform equalizer 16 performs the waveform equalization processing to the reproduction signal by reducing the gain used for the waveform equalization processing. In this case, even if a tear-shaped or M-shaped mark as shown in FIGS. 13 and 14 is recorded, the waveform distortion of the reproduction signal is reduced by the variable waveform equalizer 16 and a suitable PRML signal processing is performed to the reproduction signal after the waveform equalization processing and a decoded binary signal with good reproduction quality can be obtained in the PR equalizer 17 and the maximum likelihood decoder 18.

By the above process, stable reproduction quality can be obtained without being influenced by recording quality in this embodiment even if the PRML signal processing is performed to a reproduction signal having a large waveform distortion equal to or larger than the specified reference value.

Third Embodiment

Figure 3:
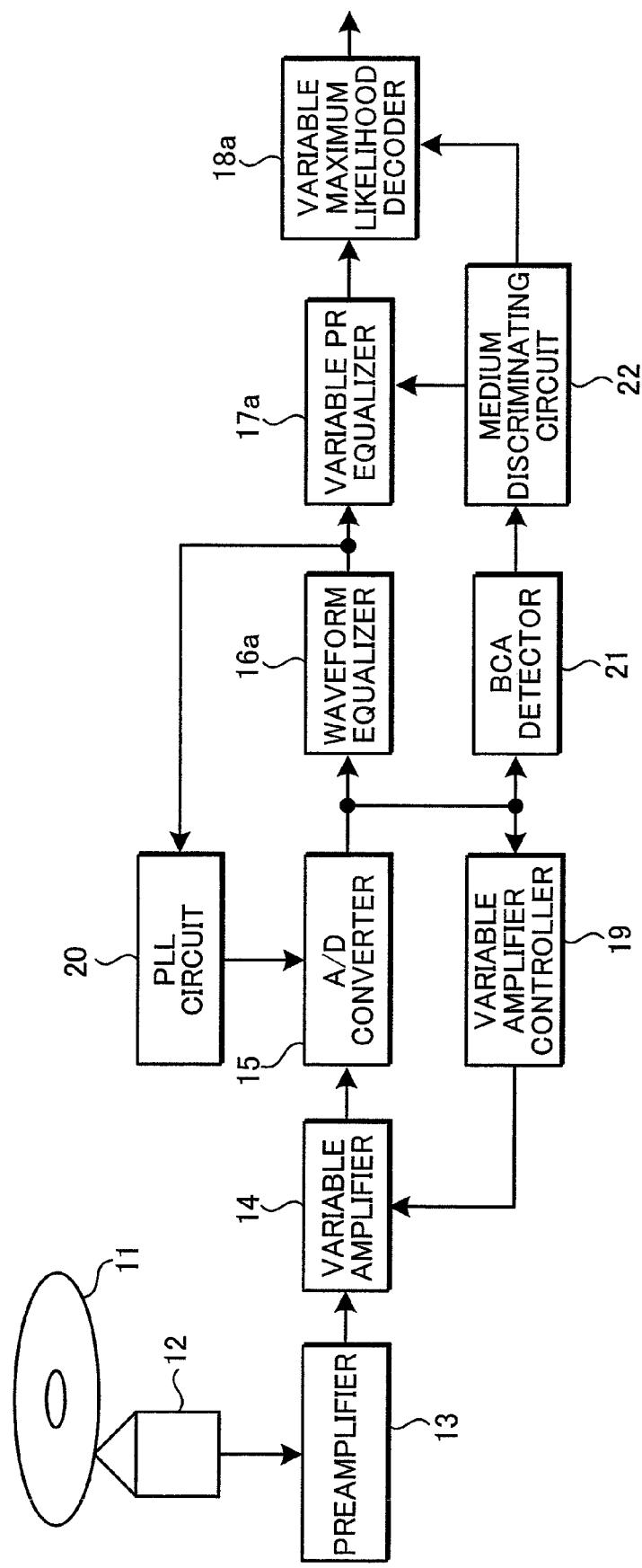
FIG. 3 is a block diagram showing the construction of an optical disc device according to a third embodiment of the invention.

Next, an optical disc device according to a third embodiment of the present invention is described. FIG. 3 is a block diagram showing the construction of the optical disc device according to the third embodiment of the present invention. The optical disc device shown in FIG. 3 differs from the one shown in FIG. 1 in that the variable waveform equalizer 16 is changed to a waveform equalizer 16a, the PR equalizer 17 to a variable PR equalizer 17 and the maximum likelihood decoder 18 to a variable maximum likelihood decoder 18a. Since the optical disc device shown in FIG. 3 is similar to the one shown in FIG. 1 in other points, same parts are identified by same reference numerals and not described in detail. Only different points are described in detail below.

The waveform equalizer 16a is constructed by a normal linear waveform equalizer and has a filter characteristic for amplifying a high-frequency range of a reproduction signal with a specified gain. The waveform equalizer 16a shapes the waveform of a reproduction signal outputted from an A/D converter 15 and outputs the resulting reproduction signal to the variable PR equalizer 17a and a PLL circuit 20.

A medium discriminating circuit 22 discriminates whether an optical disc 11 is a BD with the LtoH characteristic and the in-groove recording, a BD with the LtoH characteristic and the on-groove recording, a BD with the HtoL characteristic and the in-groove recording or a BD with the HtoL characteristic and the on-groove recording based on a track code and a characteristic code from a BCA detector 21, and controls the variable PR equalizer 17a and the variable maximum likelihood decoder 18a to perform a PR equalization processing using a class not emphasizing a high-frequency range if the optical disc 11 is the BD with the LtoH characteristic and the in-groove recording while controlling the variable PR equalizer 17a and the variable maximum likelihood decoder 18a to perform a PR equalization processing using a normally used class emphasizing a high-frequency range in the case of other BDs.

The variable PR equalizer 17a is so constructed as to be able to change a high-frequency range emphasizing PR equalization characteristic to a high-frequency range non-emphasizing PR equalization characteristic by changing the class used in the PR equalization processing from the high-frequency range emphasizing class to the high-frequency range non-emphasizing class. The following methods can be, for example, used as a method for changing the class from the high-frequency range emphasizing class to the high-frequency range non-emphasizing class in the variable PR equalizer 17a.

According to a first method, in the case of a PR (a, b, b, a) equalization characteristic, the variable PR equalizer 17a can change the class from a high-frequency range emphasizing class using A1 to a high-frequency range non-emphasizing class using A2 by using A1 and A2 smaller than A1 as A when b/a=A.

According to a second method, the variable PR equalizer 17a changes a PR equalization characteristic emphasizing 2T (T is a cycle of a channel clock) to the one not emphasizing 2T. Specifically, the variable PR equalizer 17a changes a PR(a, b, b, a) equalization characteristic to a PR(x, y, z, y, x) equalization characteristic and changes a high-frequency range emphasizing class to a high-frequency range non-emphasizing class using coefficients x, y and z to satisfy A>B when b/a=A and ((y+z)/2)/((x+y)/2)=B. For example, by increasing the order of a filter by changing PR(1, 2, 2, 1) equalization to PR(1, 2, 2, 2, 1) equalization, a change can be made to the PR equalization characteristic not emphasizing 2T.

The variable PR equalizer 17a performs the PR equalization processing using the high-frequency range non-emphasizing class to the reproduction signal and outputs the resulting reproduction signal to the variable maximum likelihood decoder 18a if the optical disc 11 is a BD with the LtoH characteristic and the in-groove recording while performing the PR equalization processing using the normally used high-frequency range emphasizing class to the reproduction signal in the other case of other BDs.

The variable maximum likelihood decoder 18a changes a maximum likelihood decoding processing in synchronism with the PR characteristic of the variable PR equalizer 17a. For example, in the first method, the variable maximum likelihood decoder 18a changes a threshold value used for decoding to an optimal value for A2 in the case of changing from A1 to A2. Further, in the second method, a threshold value and a decoding rule used for decoding are changed to optimal ones.

In this embodiment, the variable PR equalizer 17a and the variable maximum likelihood decoder 18a correspond to an example of the distortion reducing unit. This embodiment is similar to the first embodiment in other points.

Next, the operation of the optical disc device constructed as above is described. If the optical disc 11 is loaded into the optical disc device, an optical head 12 accesses to a BCA area of the optical disc 11, the BCA detector 21 detects the track code and the characteristic code of the optical disc 11 from a reproduction signal, and the medium discriminating circuit 22 discriminates whether or not the optical disc 11 is a BD with the LtoH characteristic and the in-groove recording from the detected track code and characteristic code.

Unless the optical disc 11 is a BD with the LtoH characteristic and the in-groove recording, the medium discriminating circuit 22 instructs the variable PR equalizer 17a and the variable maximum likelihood decoder 18a to maintain the high-frequency range emphasizing class (change to the high-frequency range emphasizing class if the class was already changed to the high-frequency range non-emphasizing class), the variable PR equalizer 17a performs the PR equalization processing using the high-frequency range emphasizing class to the reproduction signal after the waveform equalization, and the variable maximum likelihood decoder 18a decodes the reproduction signal after the PR equalization processing using the high-frequency range emphasizing class by a maximum likelihood decoding method and outputs a decoded binary signal with good reproduction quality.

On the other hand, if the optical disc 11 is a BD with the LtoH characteristic and the in-groove recording, the medium discriminating circuit 22 instructs the variable PR equalizer 17a and the variable maximum likelihood decoder 18a to change the class from the high-frequency range emphasizing class to the high-frequency range non-emphasizing class, the variable PR equalizer 17a performs the PR equalization processing using the high-frequency range non-emphasizing class to the reproduction signal after the waveform equalization. In this case, even if a tear-shaped or M-shaped mark as shown in FIGS. 13 and 14 is recorded, the waveform distortion of the reproduction signal is reduced by the variable PR equalizer 17a and a suitable maximum likelihood decoding processing is performed to the reproduction signal after the PR equalization processing and a decoded binary signal with good reproduction quality can be obtained in the variable maximum likelihood decoder 18a.

By the above process, stable reproduction quality can be obtained without being influenced by recording quality in this embodiment as well even if the PRML signal processing is performed to a reproduction signal having a large waveform distortion from an optical disc with poor recording quality like a BD with the LtoH characteristic and the in-groove recording.

Fourth Embodiment

Figure 4:
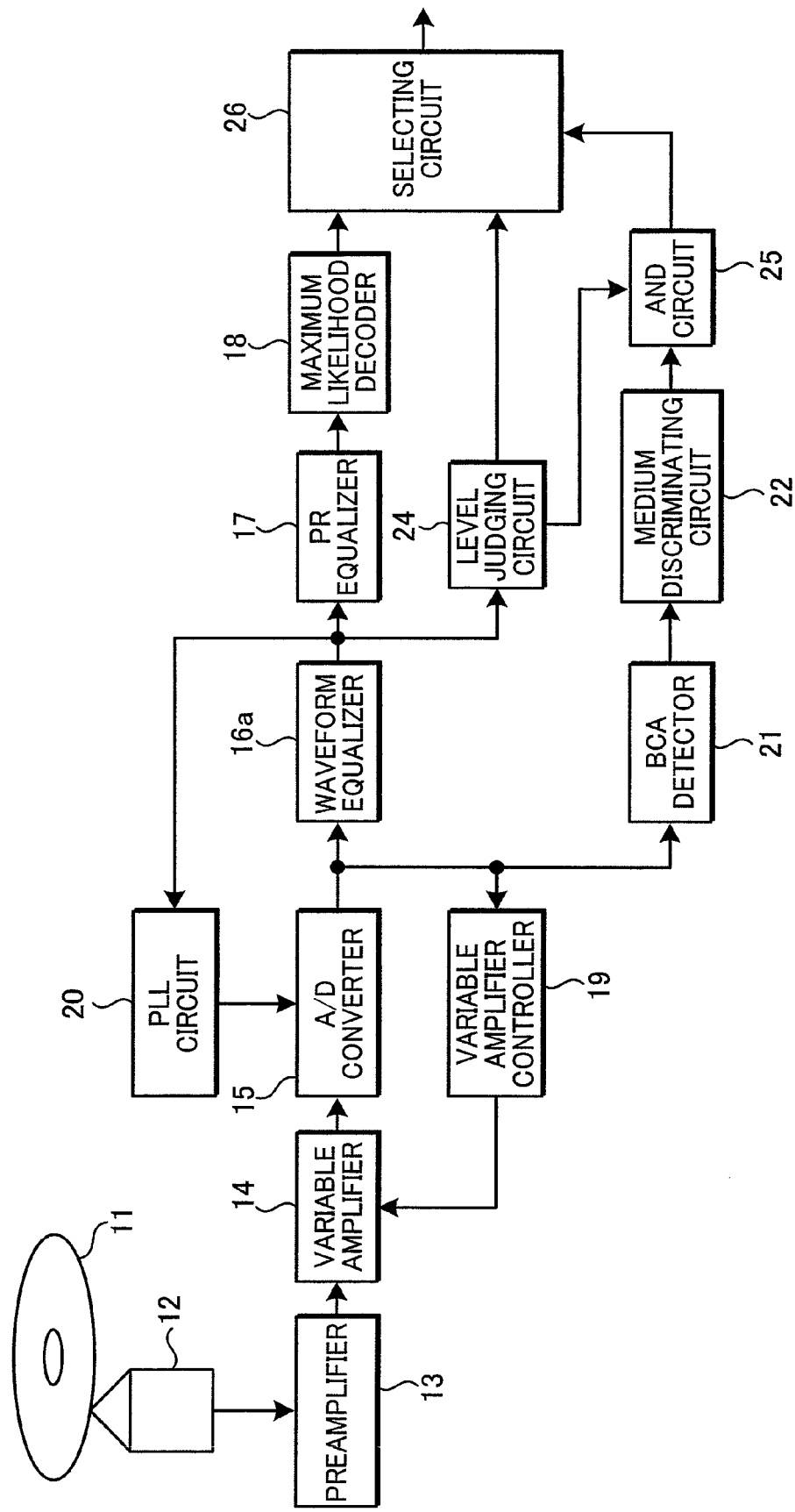
FIG. 4 is a block diagram showing the construction of an optical disc device according to a fourth embodiment of the invention.

Next, an optical disc device according to a fourth embodiment of the present invention is described. FIG. 4 is a block diagram showing the construction of the optical disc device according to the fourth embodiment of the present invention. The optical disc device shown in FIG. 4 differs from the one shown in FIG. 1 in that the variable waveform equalizer 16 is changed to the waveform equalizer 16a shown in FIG. 3 and a level judging circuit 24, an AND circuit 25 and a selecting circuit 26 are added. Since the optical disc device shown in FIG. 4 is similar to those shown in FIGS. 1 and 3 in other points, same parts are identified by same reference numerals and not described in detail. Only different points are described in detail below.

The waveform equalizer 16a is constructed by a normal linear waveform equalizer and has a filter characteristic for amplifying a high-frequency range of a reproduction signal with a specified gain. The waveform equalizer 16a shapes the waveform of a reproduction signal outputted from an A/D converter 15 and outputs the resulting reproduction signal to a PR equalizer 17, a PLL circuit 20 and the level judging circuit 24. The PR equalizer 17 and a maximum likelihood decoder 18 performs a PRML signal processing to the reproduction signal after the waveform equalization processing to decode the reproduction signal, and outputs binary data to the selecting circuit 26.

A medium discriminating circuit 22 discriminates whether an optical disc 11 is a BD with the LtoH characteristic and the in-groove recording, a BD with the LtoH characteristic and the on-groove recording, a BD with the HtoL characteristic and the in-groove recording or a BD with the HtoL characteristic and the on-groove recording based on a track code and a characteristic code from a BCA detector 21, and outputs "1" to the AND circuit 25 if the optical disc 11 is a BD with the LtoH characteristic and the in-groove recording while outputting "0" to the AND circuit 25 in the case of other BDs.

The level judging circuit 24 decodes the reproduction signal by discriminating the level of the reproduction signal after the waveform equalization processing and outputs the binary data to the selecting circuit 26. The level judging circuit 24 has a filter characteristic of excessively boosting the high-frequency range and permitting a low-frequency range to pass as it is. For example, a waveform equalizer disclosed in Japanese Patent No. 3589405 or No. 3751015 can be used.

The level judging circuit 24 detects a mark equal to or longer than a specified length (e.g. a long mark equal to or longer than 4T) using the reproduction signal after the waveform equalization processing, outputs "1" to the AND circuit 25 in the case of detecting a mark equal to or longer than the specified length while outputting "0" to the AND circuit 25 in the case of detecting a mark (e.g. mark having a length of 2T or 3T) shorter than the specified length such as an edge part.

The AND circuit 25 outputs the logical AND of the output of the medium discriminating circuit 22 and that of the level judging circuit 24 to the selecting circuit 26. If the output of the AND circuit 25 is "1", i.e. if the optical disc 11 is a BD with the LtoH characteristic and the in-groove recording and a mark equal to or longer than the specified length was detected, the selecting circuit 26 selects and outputs the binary data from the level judging circuit 24 as a decoded binary signal. On the other hand, if the output of the AND circuit 25 is "0", i.e. if the optical disc 11 is a BD with the LtoH characteristic and the in-groove recording and a mark shorter than the specified length was detected or if the optical disc 11 is not a BD with the LtoH characteristic and the in-groove recording, the selecting circuit 26 selects and outputs the binary data from the maximum likelihood decoder 18 as the decoded binary signal.

A method for selecting the binary data by the selecting circuit 26 is not particularly limited to the above example and can be variously changed. An OR circuit may be used instead of the AND circuit 25, and the binary data from the level judging circuit 24 may be selected if the optical disc 11 is a BD with the LtoH characteristic and the in-groove recording or if a mark equal to or longer than the specified length was detected. Further, a similar processing may be performed also in the case where a space equal to or longer than a specified length was detected.

In this embodiment, the BCA detector 21, the medium discriminating circuit 22, the level judging circuit 24 and the AND circuit 25 correspond to an example of the acquiring unit and the PR equalizer 17, the maximum likelihood decoder 18, the level judging circuit 24 and the selecting circuit 26 correspond to an example of the distortion reducing unit.

Next, the operation of the optical disc device constructed as above is described. If the optical disc 11 is loaded into the optical disc device, an optical head 12 accesses to a BCA area of the optical disc 11, the BCA detector 21 detects the track code and the characteristic code of the optical disc 11 from a reproduction signal, and the medium discriminating circuit 22 discriminates whether or not the optical disc 11 is a BD with the LtoH characteristic and the in-groove recording from the detected track code and characteristic code and outputs "1" to the AND circuit 25 if the optical disc is a BD with the LtoH characteristic and the in-groove recording while outputting "0" to the AND circuit 25 in the case of other BDs.

Subsequently, the optical head 12 accesses to a control data area or a data recording area of the optical disc 11, and the level judging circuit 24 detects a mark equal to or longer than the specified length using the reproduction signal after the waveform equalization processing and outputs "1" to the AND circuit 25 in the case of detecting the mark equal to or longer than the specified length while outputting "0" to the AND circuit 25 in the case of detecting a mark shorter than the specified length.

The AND circuit 25 outputs the logical AND of the output of the medium discriminating circuit 22 and that of the level judging circuit 24 to the selecting circuit 26, and the selecting circuit 26 selects and outputs the binary data from the level judging circuit 24 as the decoded binary signal if the output of the AND circuit 25 is "1", i.e. if the optical disc 11 is a BD with the LtoH characteristic and the in-groove recording and a mark equal to or longer than the specified length was detected. In this case, the reproduction signal processed by the level judging circuit 24 is a signal of the long mark having a large waveform distortion. Since the level judging circuit 24 can satisfactorily operate in response to this signal, the decoded binary signal with good reproduction quality can be obtained.

On the other hand, if the output of the AND circuit 25 is "0", i.e. if the optical disc 11 is a BD with the LtoH characteristic and the in-groove recording and a mark shorter than the specified length was detected or if the optical disc 11 is not a BD with the LtoH characteristic and the in-groove recording, the selecting circuit 26 selects and outputs the binary data from the maximum likelihood decoder 18 as the decoded binary signal. In this case, the reproduction signal processed by the PR equalizer 17 and the maximum likelihood decoder 18 is a signal to which the PR equalizer 17 and the maximum likelihood decoder 18 can satisfactorily operate such as a signal having a small waveform distortion or a signal representing an edge part. Therefore, the decoded binary signal with good reproduction quality can be obtained.

By the above process, the level judgment processing is performed to a reproduction signal of a long mark reproduced from a BD with the LtoH characteristic and the in-groove recording and a PRML signal processing is performed to other reproduction signals in this embodiment. Therefore, stable reproduction quality can be obtained without being influenced by recording quality even if the PRML signal processing is performed to a reproduction signal having a large waveform distortion from an optical disc with poor recording quality.

Fifth Embodiment

Figure 5:
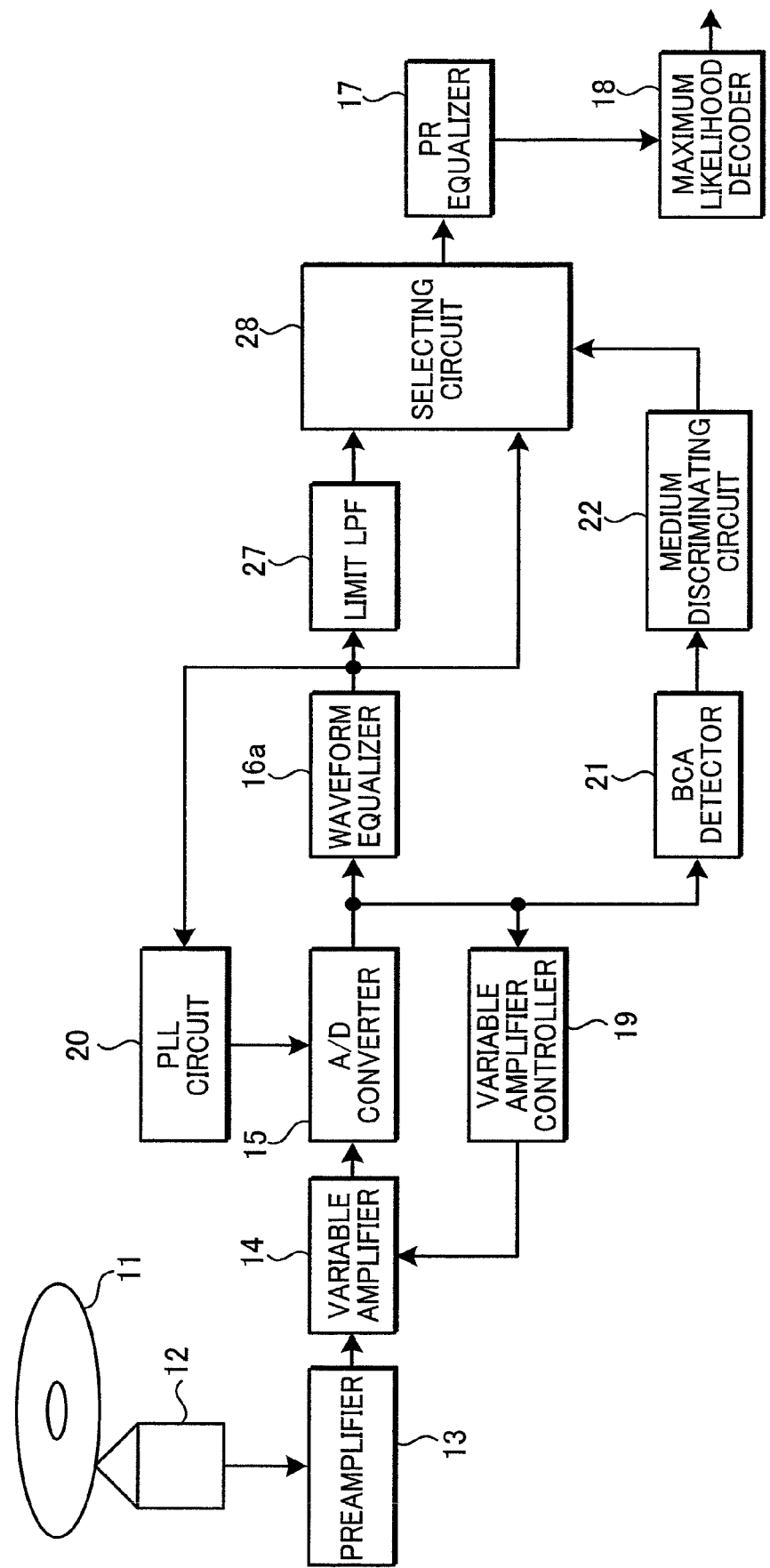
FIG. 5 is a block diagram showing the construction of an optical disc device according to a fifth embodiment of the invention.

Next, an optical disc device according to a fifth embodiment of the present invention is described. FIG. 5 is a block diagram showing the construction of the optical disc device according to the fifth embodiment of the present invention. The optical disc device shown in FIG. 5 differs from the one shown in FIG. 1 in that the variable waveform equalizer 16 is changed to the waveform equalizer 16a shown in FIG. 3 and a limit LPF (low-pass filter) 27 and a selecting circuit 28 are added. Since the optical disc device shown in FIG. 5 is similar to those shown in FIGS. 1 and 3 in other points, same parts are identified by same reference numerals and not described in detail. Only different points are described in detail below.

The waveform equalizer 16a is constructed by a normal linear waveform equalizer and has a filter characteristic for amplifying a high-frequency range of a reproduction signal with a specified gain. The waveform equalizer 16a shapes the waveform of a reproduction signal outputted from an A/D converter 15 and outputs the resulting reproduction signal to a PLL circuit 20, the limit LPF 27 and the selecting circuit 28.

The limit LPF 27 performs a low-pass filter processing to a reproduction signal with a waveform equal to or higher than a specified level and outputs the resulting reproduction signal to the selecting circuit 28. The arrangement position of the limit LPF is not particularly limited to the above example. The limit LPF may be arranged between other circuits.

Figure 6:
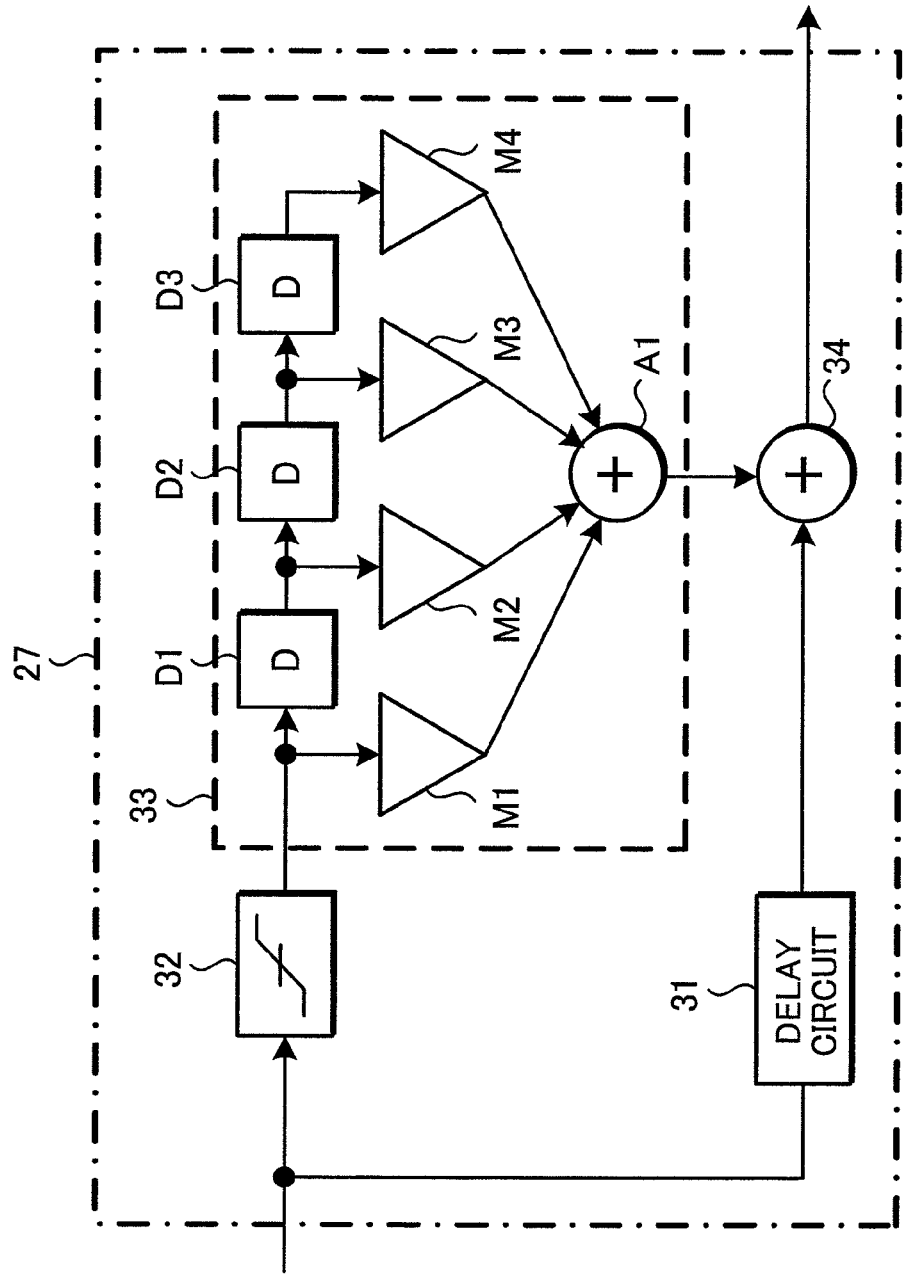
FIG. 6 is a circuit diagram showing an exemplary construction of a limit FPF shown in FIG. 5.

A basic construction of the limit LPF 27 is similar to the waveform equalizer disclosed in the publication of Japanese Patent No. 3589405 or No. 3751015 as described below, but has a different characteristic. FIG. 6 is a circuit diagram showing an exemplary construction of the limit LPF 27 shown in FIG. 5. As shown in FIG. 6, the limit LPF 27 includes a delay circuit 31, an adaptive limiter 32, a LPF 33 and an adder 34. The LPF 33 includes delay devices D1 to D3, multipliers M1 to M4 and an adder A1.

Upon receiving a digital reproduction signal $S(i)$, the adaptive limiter 32 outputs $S(i)$ as it is if $abs(S(i)) > Th$ (Th is a threshold value) while outputting "0" in other cases. This threshold value Th is adaptively updated as follows.

Specifically, if (sgn(Si))≠(sgn(S(i−1)), updating is performed such that Th=Th+[g×abs{S(i)−S(i−1)}−Th]/n (here, g is a parameter for determining a target of Th, n is a parameter for determining a loop gain and the respective parameters are set to suitable values). In other cases, Th=Th. This update equation, Th=Th+[g×abs{S(i)−S(i−1)}−Th]/n, means to compare an amplitude difference (average) of sample values at the time of zero crossing and the present threshold value and to perform an integration operation using a difference between the both values as an error.

The LPF 33 performs a low-pass filter processing to the reproduction signal from the adaptive limiter 32 and outputs the resulting reproduction signal to the adder 34. Here, tap coefficients of the multipliers M1 to M4 are suitably set to attain a filter characteristic capable of reducing a waveform distortion. The delay circuit 31 receives the digital reproduction signal from the waveform equalizer 16a, adjusts the phase thereof and outputs the resulting reproduction signal to the adder 34. The adder 34 adds the output of the delay circuit 31 and that of the LPF 33 and outputs the resulting sum to the selecting circuit 28. As a result, the reproduction signal after the low-pass filter processing for the waveform equal to or higher than the specified level can be generated.

Referring back to FIG. 5 again, the medium discriminating circuit 22 discriminates whether an optical disc 11 is a BD with the LtoH characteristic and the in-groove recording, a BD with the LtoH characteristic and the on-groove recording, a BD with the HtoL characteristic and the in-groove recording or a BD with the HtoL characteristic and the on-groove recording based on a track code and a characteristic code from a BCA detector 21, and controls the selecting circuit 28 to select the output of the limit LPF 27 if the optical disc 11 is a BD with the LtoH characteristic and the in-groove recording while controlling the selecting circuit 28 to select the output of the waveform equalizer 16a in the case of other BDs.

Under the control of the medium discriminating circuit 22, the selecting circuit 28 selects the output of the limit LPF 27 and outputs it to the PR equalizer 17 if the optical disc 11 is a BD with the LtoH characteristic and the in-groove recording while selecting the output of the waveform equalizer 16a and outputs it to the PR equalizer 17 in the case of other BDs.

In this embodiment, the PR equalizer 17, the maximum likelihood decoder 18, the limit LPF 27 and the selecting circuit 28 correspond to an example of the distortion reducing unit. This embodiment is similar to the first embodiment in other points.

Next, the operation of the optical disc device constructed as above is described. If the optical disc 11 is loaded into the optical disc device, an optical head 12 accesses to a BCA area of the optical disc 11, the BCA detector 21 detects the track code and the characteristic code of the optical disc 11 from a reproduction signal, and the medium discriminating circuit 22 discriminates whether or not the optical disc 11 is a BD with the LtoH characteristic and the in-groove recording from the detected track code and characteristic code and instructs the selecting circuit 28 to select the output of the limit LPF 27 if the optical disc 11 is a BD with the LtoH characteristic and the in-groove recording while instructing the selecting circuit 28 to select the output of the waveform equalizer 16a in the case of other BDs.

Unless the optical disc 11 is a BD with the LtoH characteristic and the in-groove recording, the selecting circuit 28 selects the output of the waveform equalizer 16a and outputs it to the PR equalizer 17, and the PR equalizer 17 and the maximum likelihood decoder 18 performs a PRML signal processing to the reproduction signal having a small waveform distortion and outputs a decoded binary signal with good reproduction quality.

On the other hand, if the optical disc 11 is a BD with the LtoH characteristic and the in-groove recording, the selecting circuit 28 selects the output of the limit LPF 27 and outputs it to the PR equalizer 17, and the PR equalizer 17 and the maximum likelihood decoder 18 performs the PRML signal processing to the reproduction signal obtained by low-pass filtering the reproduction signal with a waveform equal to or higher than the specified level to output a decoded binary signal. In this case, since the reproduction signal processed by the PR equalizer 17 and the maximum likelihood decoder 18 is the signal obtained by low-pass filtering the reproduction signal with the waveform equal to or higher than the specified level, the PR equalizer 17 and the maximum likelihood decoder 18 can perform a suitable PRML signal processing and can obtain the decoded binary signal with good reproduction quality.

By the above process, stable reproduction quality can be obtained without being influenced by recording quality in this embodiment as well even if the PRML signal processing is performed to a reproduction signal having a large waveform distortion from an optical disc with poor recording quality like a BD with the LtoH characteristic and the in-groove recording.

Sixth Embodiment

Figure 7:
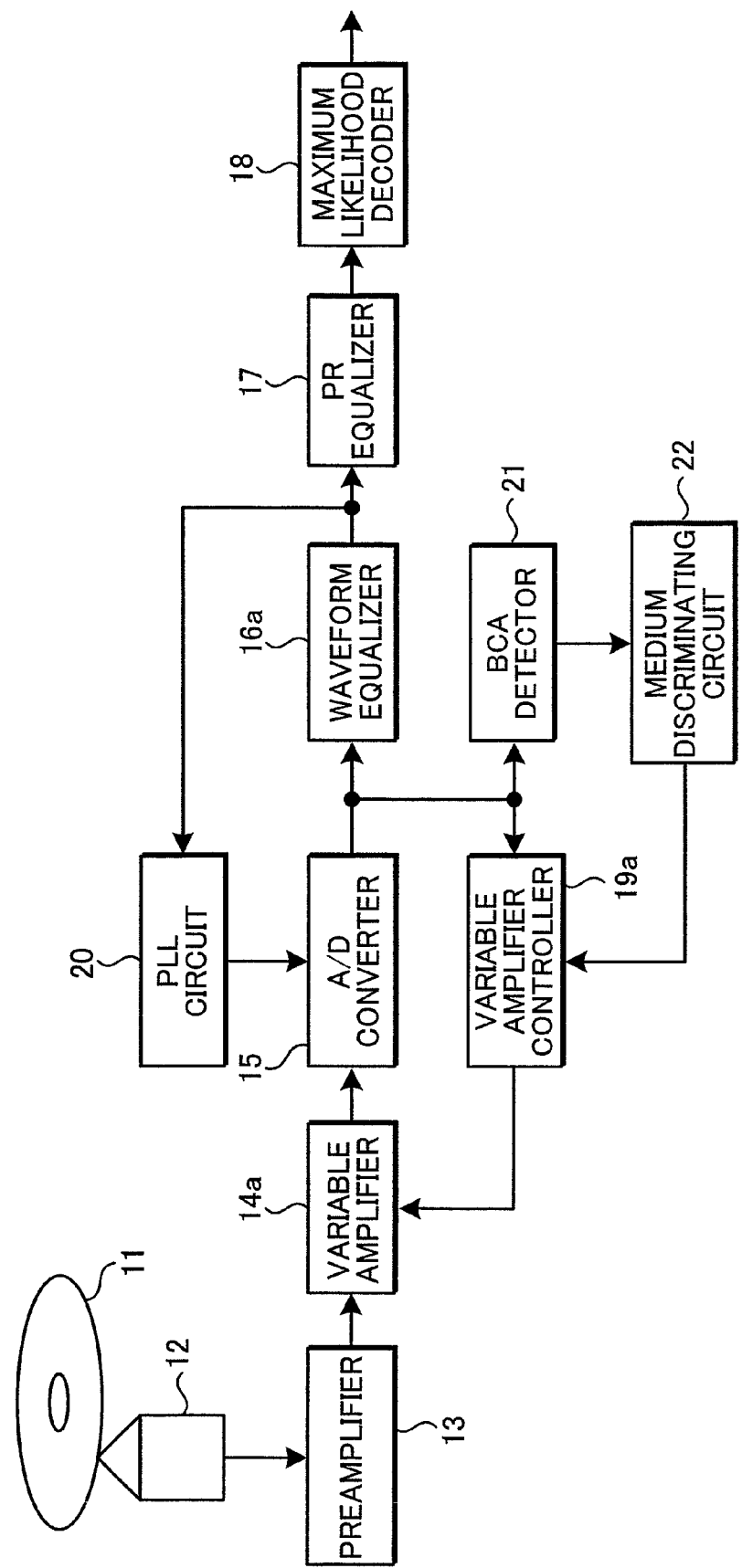
FIG. 7 is a block diagram showing the construction of an optical disc device according to a sixth embodiment of the invention.

Next, an optical disc device according to a sixth embodiment of the present invention is described. FIG. 7 is a block diagram showing the construction of the optical disc device according to the sixth embodiment of the present invention. The optical disc device shown in FIG. 7 differs from the one shown in FIG. 1 in that the variable waveform equalizer is changed to a waveform equalizer 16a and the variable amplifier 14 and the variable amplifier controller 19 are changed to a variable amplifier 14a and a variable amplifier controller 19a for changing a target gain of an AGC. Since the optical disc device shown in FIG. 7 is similar to the one shown in FIG. 1 in other points, same parts are identified by same reference numerals and not described in detail. Only different points are described in detail below.

A medium discriminating circuit 22 discriminates whether an optical disc 11 is a BD with the LtoH characteristic and the in-groove recording, a BD with the LtoH characteristic and the on-groove recording, a BD with the HtoL characteristic and the in-groove recording or a BD with the HtoL characteristic and the on-groove recording based on a track code and a characteristic code from a BCA detector 21, and instructs the variable amplifier controller 19a to increase the target gain of the variable amplifier 14a if the optical disc 11 is a BD with the LtoH characteristic and the in-groove recording while instructing the variable amplifier controller 19a to maintain (to reduce if the target gain was already increased) a normal target gain of the variable amplifier 14a in the case of other BDs.

The variable amplifier 14a and the variable amplifier controller 19a constitute an automatic gain control circuit, and the variable amplifier 14a amplifies a reproduction signal from a preamplifier 13 using the target gain instructed by the variable amplifier controller 19a such that the level of the reproduction signal outputted from the waveform equalizer 16a becomes a fixed level, and outputs the resulting reproduction signal to an A/D converter 15.

The variable amplifier 19a detects the level of a digital signal from the A/D converter 15 and automatically adjusts the gain of the variable amplifier 14a so that the level of the reproduction signal outputted from the waveform equalizer 16a becomes the fixed level. At this time, in accordance with the instruction from the medium discriminating circuit 22, the variable amplifier controller 19a instructs the variable amplifier 14a to increase the target gain of the AGC and the variable amplifier 14a increases the target gain of the AGC such that the reproduction signal converted into the digital signal by the A/D converter 15 exceeds a dynamic range in a digital signal processing after the A/D converter 15 by a specified level if the optical disc 11 is a BD with the LtoH characteristic and the in-groove recording.

On the other hand, unless the optical disc 11 is a BD with the LtoH characteristic and the in-groove recording, the variable amplifier controller 19a instructs the variable amplifier 14a to maintain the target gain of the AGC and the variable amplifier 14a maintains the target gain of the AGC such that the reproduction signal converted into the digital signal by the A/D converter 15 does not exceed the dynamic range in the digital signal processing after the A/D converter 15.

A method for varying the amplitude of a digital value is not particularly limited to the above example and can be variously changed. The amplitude of the effective digital value may be varied not only by the variation of the AGC target, but also by another method. For example, an effective digital value of the output of the waveform equalizer can be increased or decreased by varying the coefficient of the waveform equalizer 16a.

In this embodiment, the variable amplifier 14a and the variable amplifier controller 19a correspond to an example of the distortion reducing unit. This embodiment is similar to the first embodiment in other points.

Next, the operation of the optical disc device constructed as above is described. If the optical disc 11 is loaded into the optical disc device, an optical head 12 accesses to a BCA area of the optical disc 11, the BCA detector 21 detects the track code and the characteristic code of the optical disc 11 from a reproduction signal, and the medium discriminating circuit 22 discriminates whether or not the optical disc 11 is a BD with the LtoH characteristic and the in-groove recording from the detected track code and characteristic code.

Unless the optical disc 11 is a BD with the LtoH characteristic and the in-groove recording, the medium discriminating circuit 22 instructs the variable amplifier controller 19a to maintain the target gain of the AGC, the variable amplifier controller 19a controls the variable amplifier 14a to maintain the normal target gain and the variable amplifier 14a amplifies the reproduction signal with the normal target gain. As a result, the waveform equalizer 16a performs a waveform equalization processing to the reproduction signal amplified with the normal target gain, and a PR equalizer 17 and a maximum likelihood decoder 18 perform a PRML signal processing to the reproduction signal after the normal waveform equalization processing and output a decoded binary signal with good reproduction quality.

On the other hand, if the optical disc 11 is a BD with the LtoH characteristic and the in-groove recording, the medium discriminating circuit 22 instructs the variable amplifier controller 19a to increase the target gain of the AGC and the variable amplifier controller 19a controls the variable amplifier 14a to increase the target gain of the AGC. At this time, the variable amplifier 14a amplifies the reproduction signal by increasing the target gain of the AGC such that the reproduction signal converted into the digital signal by the A/D converter 15 exceeds the dynamic range in the digital signal processing after the A/D converter 15 by the specified level. As a result, a large waveform distortion of the reproduction signal is removed by the dynamic range in the digital signal processing, the waveform equalizer 16a performs the waveform equalization processing to the reproduction signal having a small waveform distortion, and a suitable PRML signal processing is performed to the reproduction signal after the waveform equalization processing in the PR equalizer 17 and the maximum likelihood decoder 18, wherefore a decoded binary signal with good reproduction quality can be obtained.

By the above process, stable reproduction quality can be obtained without being influenced by recording quality in this embodiment even if the PRML signal processing is performed to a reproduction signal having a large waveform distortion from an optical disc with poor recording quality like a BD with the LtoH characteristic and the in-groove recording.

The above respective embodiments can be arbitrarily combined according to needs. For example, the waveform distortion detecting circuit 23 of the second embodiment may be used instead of the BCA detector 21 and the medium discriminating circuit 22 in the third to sixth embodiments or a plurality of the distortion reducing units of the first, third and sixth embodiment may be simultaneously used.

Seventh Embodiment

Figure 8:
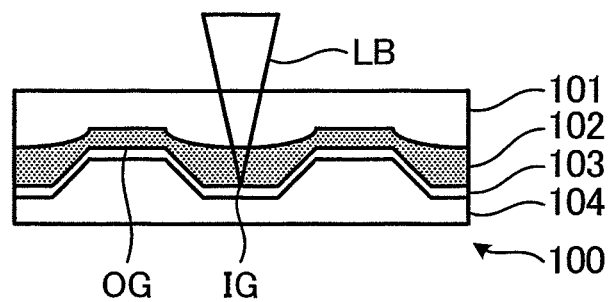
FIG. 8 is a block diagram showing the structure of an optical disc according to a seventh embodiment of the invention.

Next, an optical disc as an example of an optical recording medium according to a seventh embodiment of the present invention is described. FIG. 8 is a section showing the structure of the optical disc according to the seventh embodiment of the present invention, and FIG. 9 is a plan view of the optical disc shown in FIG. 8.

Figure 9:
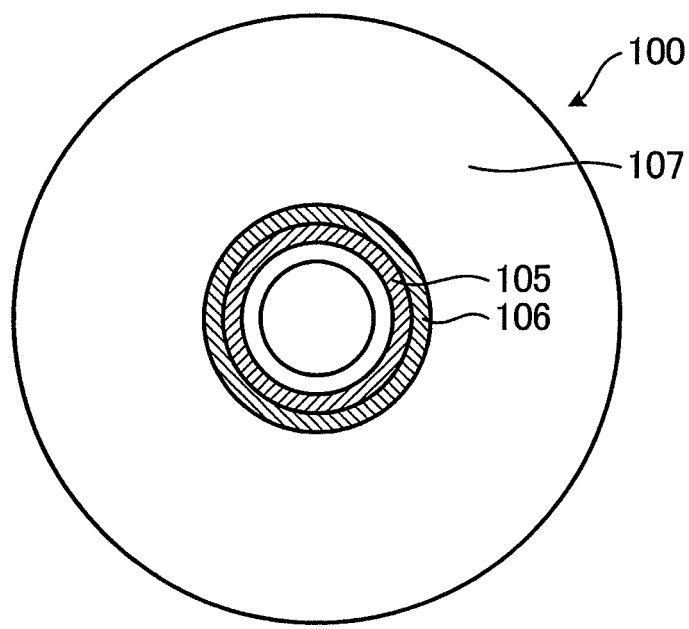
FIG. 9 is a plan view of the optical disc shown in FIG. 8.

An optical disc 100 shown in FIGS. 8 and 9 is a recordable optical recording medium in which information is recorded on a land track and which has an LtoH characteristic in which the reflectance of a recorded area is higher than that of an unrecorded area and is, for example, a BD-R having a recording layer in which the reflectance of a recorded area is higher than that of an unrecorded area and designed to record information on a land track specified by a groove.

As shown in FIG. 8, the optical disc 100 includes a transparent layer 101, a recording layer 102, a reflection film 103 and a substrate 104. The optical disc 100 is manufactured, for example, as follows. First of all, a groove is formed in the substrate 104 by injection molding. Subsequently, the reflection film 103 is formed on the injection molded substrate 104 by sputtering or the like. Subsequently, an organic dye recording layer is formed on the reflection film 103 by spin coating, thereby forming the recording layer 102 for recording information on a land track IG specified by the groove. Finally, the transparent layer 101 is formed on the recording layer 102.

As shown in FIG. 9, the optical disc 100 includes a BCA area 105, a lead-in zone 106 as a control data area and a data recording area 107 successively from an inner circumferential side. Although not shown, a lead-out zone and an outer-zone may be provided as control data areas.

The BCA area 105 is an area for recording information for more detailed classification for optical discs having the same content recorded in the control data area, e.g. for recording information for copyright protection such as a unique number for medium identification. Information recording in this BCA area 105 is performed by recording a barcode at a factory after the disc is manufactured. This recording can be performed, for example, by the same principle as the one of recording information in the data recording area, or by utilizing a characteristic change of a film or by partially removing the film by trimming.

The lead-in zone 106 is an area where management information and the like are prerecorded and includes a PIC (Permanent Information and Control Data) area, an OPC (Optimum Power Control) area and an INFO area. The data recording area 107 is an area where data are recorded by a user.

Here, in the manufacturing process of the optical disc 100, medium specification information is recorded, for example, in a glass master by a mastering apparatus at the time of cutting, a metal master is produced from this glass master, and the optical disc 100 is manufactured using this metal master as a stamper, whereby the medium specification information is recorded on the optical disc 100.

For example, a track code indicating to which of a groove track and a land track a tracking servo is to be performed and a characteristic code indicating which of the LtoH characteristic and the HtoL characteristic is possessed, which codes become the medium specification information, are prerecorded as at least one of information recorded in the BCA area 105, information recorded in the PIC area of the lead-in zone 106 and information recorded in the lead-in zone 106 using a wobble in the manufacturing process of the optical disc 100.

A method for recording the medium specification information is not particularly limited to the above example. It is preferable to record at least two of the information recorded in the BCA area 105, the information recorded in the PIC area of the lead-in zone 106 and the information recorded in the lead-in zone 106 using a wobble as the medium specification information in the optical disc 100, more preferable to record the same medium specification information in all of these three areas.

If the optical disc 100 is a multilayer optical disc having a plurality of recording layers, it is preferable to record the medium specification information on each recording layer and to individually record the track code, the characteristic code and the like of each recording layer.

If the optical disc 100 is a multilayer optical disc having a plurality of recording layers, the PIC area may be provided in a layer $L_0$ most distant from a light incident surface out of the plurality of recording layers and the medium specification information may be recorded in this PIC area.

For example, if the optical disc 100 is a two-layer optical disc having layers $L_0$ and $L_1$ as recording layers, the PIC area of a BD-RE or BD-ROM is formed in both layers $L_0$ and $L_1$, but the PIC area of the BD-R is formed only in the layer $L_0$ most distant from the light incident surface. Accordingly, the medium specification information is recorded at least in one PIC area of the layers $L_0$ and $L_1$ in the case of the BD-RE and BD-ROM while being recorded in the PIC area of the layer $L_0$ in the case of the BD-R.

In the manufacturing process, if the medium specification information is recorded in none of the BCA area 105, the PIC area in the lead-in zone 106 and a wobble formation area of the lead-in zone 106 in the optical disc 100, information indicating the HtoL characteristic and the like may be set in the data recording area 107 or the like. An optical disc manufacturer may set the information indicating the HtoL characteristic and the like as a default value in the manufacturing process. The above points similarly hold for the optical discs according to the other embodiments.

Figure 10:
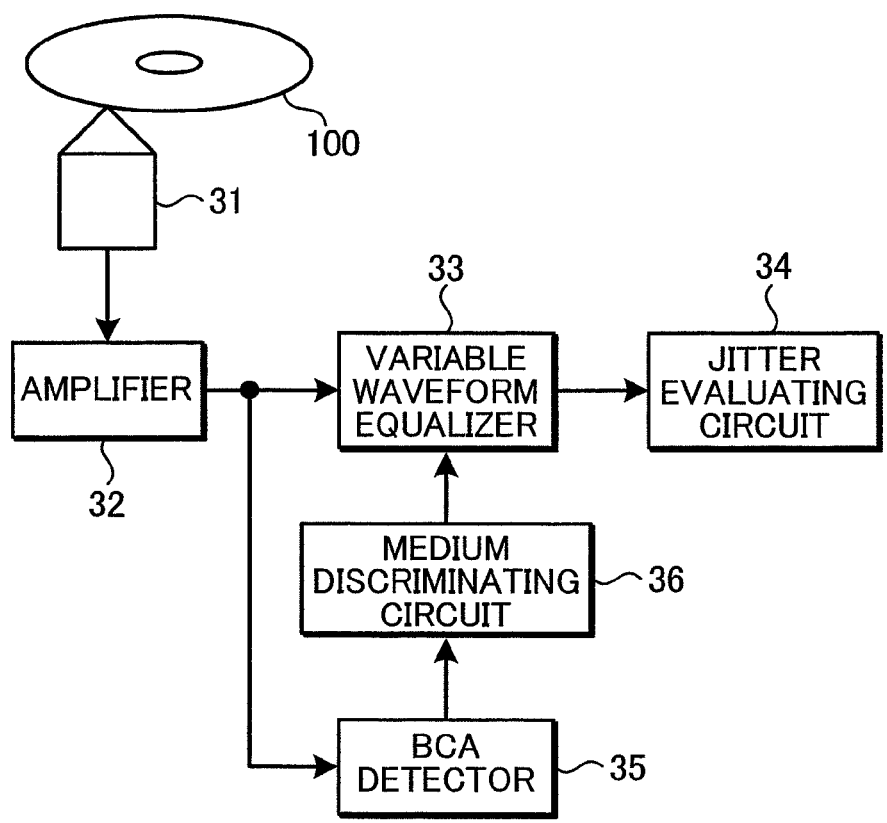
FIG. 10 is a block diagram showing the construction of an evaluation device for evaluating characteristics of the optical disc shown in FIGS. 8 and 9.

After being manufactured as above, the optical disc 100 has various characteristic evaluated. FIG. 10 is a block diagram showing the construction of an evaluation device for evaluating characteristics of the optical disc shown in FIGS. 8 and 9.

The evaluation device shown in FIG. 10 is provided with an optical head 31, an amplifier 32, a variable waveform equalizer 33, a jitter evaluating circuit 34, a BCA detector 35 and a medium discriminating circuit 36.

The optical head 31 includes a semiconductor laser, an objective lens, an actuator and the like, irradiates a laser beam to the optical disc 100 to reproduce the recorded information and outputs reproduction signals to the amplifier 32. The amplifier 32 amplifies the reproduction signals from the optical disc 100 with a specified gain, outputs the reproduction signal from the data recording area to the variable waveform equalizer 33 and outputs the reproduction signal from the BCA area to the BCA detector 35.

The variable waveform equalizer 33 is so constructed as to be able to change a gain used for a waveform equalization processing in addition to a normal construction of a linear waveform equalizer and has a filter characteristic for amplifying a high-frequency range of the reproduction signal. The variable waveform equalizer 33 shapes the waveform of the reproduction signal using a gain instructed by the medium discriminating circuit 36 and outputs the resulting reproduction signal to the jitter evaluating circuit 34 to apply a pre-processing to a high-frequency signal for jitter measurement. Here, the reproduction signal of a short mark, e.g. a shortest mark corresponds to the high-frequency signal. In the BD, a signal of 2T corresponds thereto.

The BCA detector 35 detects the medium specification information including the track code and the characteristic code from the reproduction signal from the BCA area and outputs it to the medium discriminating circuit 36. The medium discriminating circuit 36 discriminates whether the optical disc 100 is a BD with the LtoH characteristic and the in-groove recording based on the track code and the characteristic code and controls the variable waveform equalizer 33 to reduce the gain used for the waveform equalization processing if the optical disc 11 is the BD with the LtoH characteristic and the in-groove recording while controlling the variable waveform equalizer 33 to maintain a normal gain (increase to an initial gain if the gain was already reduced) in the case of other BDs.

The jitter evaluating circuit 34 measures the jitter of the reproduction signal having the pre-processing applied to the high-frequency signal for jitter measurement by the variable waveform equalizer 33 to evaluate a jitter characteristic of the optical disc 100. As a result, the evaluation device shown in FIG. 10 can improve the distortion of the reproduction signal by reducing the gain used for the waveform equalization processing if the optical disc 100 is a BD with the LtoH characteristic and the in-groove recording. Therefore, the characteristics of the optical disc 100 can be more properly evaluated.

In this way, in the evaluation device shown in FIG. 10, the BCA detector 35 acquires the medium specification information as waveform distortion information for specifying the waveform distortion of the reproduction signal reproduced from the optical disc 100, the medium discriminating circuit 36 changes the gain of the variable waveform equalizer 33 as a parameter used in the signal processing relating to the waveform distortion of the reproduction signal reproduced from the optical disc 100 based on the medium specification information, and the jitter evaluating circuit 34 evaluates the jitter characteristic of the optical disc 100. At this time, the gain of the variable waveform equalizer 33 is reduced only by several dB to reduce the waveform distortion if the optical disc 100 is a BD with the LtoH characteristic and the in-groove recording. Therefore, the jitter characteristic of the BD with the LtoH characteristic and the in-groove recording can be properly evaluated.

Although the BCA detector 35 acquires the medium specification information as the waveform distortion information in the evaluation device shown in FIG. 10, the evaluation device is not particularly limited to this example. For example, the BCA detector 35 and the medium discriminating circuit 36 may be omitted and an evaluator using the evaluation device may judge whether the optical disc 100 is a BD with the LtoH characteristic and the in-groove recording and may change the gain of the variable waveform equalizer 33 if the optical disc 100 is a BD with the LtoH characteristic and the in-groove recording. This point similarly holds for the other embodiments.

The optical disc 100 evaluated as above is sold in the market and information is recorded on the land track IG or information recorded on the land track IG is reproduced by irradiating a laser beam LB to the recording layer 102 via the transparent layer 101 using the optical disc device according to any one of the above first to sixth embodiments. The signal processing relating to the waveform distortion at this time is adjusted by changing the parameter used in the signal processing based on the waveform distortion information for specifying the waveform distortion of the reproduction signal as described above, and the parameter is changed to reduce the waveform distortion more than in a signal processing relating to a waveform distortion of a reproduction signal reproduced from an optical disc in which the reflectance of a recorded area is lower than that of an unrecorded area.

Although the BD with the LtoH characteristic and the in-groove recording is described above, a BD with the LtoH characteristic and the on-groove recording may be similarly processed.

Eighth Embodiment

Figure 11:
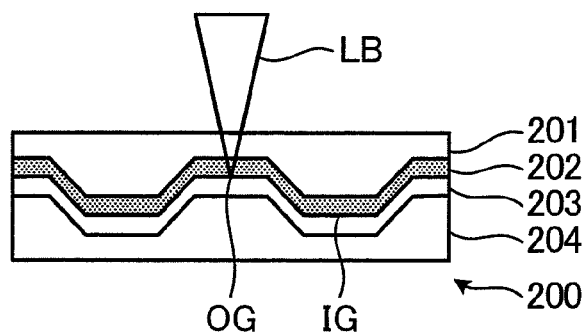
FIG. 11 is a section showing the structure of an optical disc according to an eighth embodiment of the invention.
Figure 12:
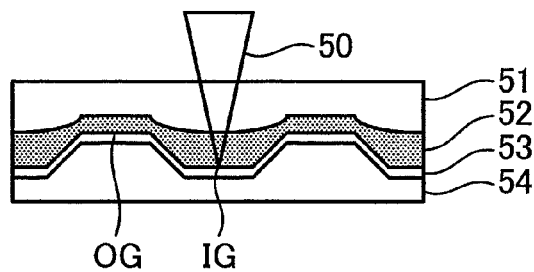
FIG. 12 is a diagram showing the structure of a BD formed with an organic dye recording film formed by spin coating.

Next, an optical disc according to an eighth embodiment of the present invention is described. FIG. 11 is a section showing the structure of the optical disc according to the eighth embodiment of the present invention.

An optical disc 200 shown in FIG. 11 is a recordable optical recording medium in which information is recorded on a groove track and which has an HtoL characteristic in which the reflectance of a recorded area is lower than that of an unrecorded area and is, for example, a BD-R having a recording layer in which the reflectance of a recorded area is lower than that of an unrecorded area and designed to record information on a groove track specified by a groove.

As shown in FIG. 11, the optical disc 200 includes a transparent layer 201, a recording layer 202, a reflection film 203 and a substrate 204. The optical disc 200 is manufactured, for example, as follows. First of all, a groove is formed in the substrate 204 by injection molding. Subsequently, the reflection film 203 is formed on the injection molded substrate 204 by sputtering or the like. Subsequently, a recording layer made of an inorganic recording material is formed on the reflection film 203 by a deposition method, thereby forming the recording layer 202 for recording information on a groove track OG specified by the groove. Finally, the transparent layer 201 is formed on the recording layer 202.

The linear recording density of the optical disc 200 is the same as that of the optical disc 100 shown in FIGS. 8 and 9. If the disc diameter of the optical disc 200 is equal to that of the optical disc 100, the recording capacity of the optical disc 200 is the same as that of the optical disc 100.

Similar to the optical disc 100 shown in FIG. 9, the optical disc 200 includes a BCA area, a lead-in zone as a control data area and a data recording area successively from an inner circumferential side. For example, a track code indicating to which of a groove track and a land track a tracking servo is to be performed and a characteristic code indicating which of the LtoH characteristic and the HtoL characteristic is possessed, which codes become the medium specification information, are prerecorded as at least one of information recorded in the BCA area, information recorded in a PIC area of the lead-in zone and information recorded in the lead-in zone using a wobble in the manufacturing process of the optical disc 200.

After being manufactured as above, the optical disc 200 also has various characteristics evaluated similar to the optical disc 100 shown in FIGS. 8 and 9 and, for example, has a jitter characteristic thereof evaluated as follows by the evaluation device shown in FIG. 10.

The optical head 31 irradiates a laser beam to the optical disc 200 to reproduce the recorded information and outputs reproduction signals to the amplifier 32. The amplifier 32 amplifies the reproduction signals from the optical disc 200, outputs the reproduction signal from the data recording area to the variable waveform equalizer 33 and outputs the reproduction signal from the BCA area to the BCA detector 35. The variable waveform equalizer 33 shapes the waveform of the reproduction signal using a gain instructed by the medium discriminating circuit 36 and outputs the resulting reproduction signal to the jitter evaluating circuit 34 to apply a pre-processing to a high-frequency signal for jitter measurement.

Here, the BCA detector 35 detects the medium specification information including the track code and the characteristic code from the reproduction signal from the BCA area and outputs it to the medium discriminating circuit 36. The medium discriminating circuit 36 discriminates whether the optical disc 200 is a BD with the HtoL characteristic and the on-groove recording based on the track code and the characteristic code and controls the variable waveform equalizer 33 to increase the gain more than a gain used for a waveform equalization processing of a BD with the LtoH characteristic and the in-groove recording, i.e. to maintain a normal gain (to increase to an initial gain if the gain was already reduced) if the optical disc 200 is a BD with the HtoL characteristic and the on-groove recording.

The jitter evaluating circuit 34 measures the jitter of the reproduction signal having the pre-processing applied to the high-frequency signal for jitter measurement by the variable waveform equalizer 33 to evaluate a jitter characteristic of the optical disc 200. As a result, the evaluation device shown in FIG. 10 can improve the distortion of the reproduction signal by increasing the gain used for the waveform equalization processing if the optical disc 200 is a BD with the HtoL characteristic and the on-groove recording. Therefore, the characteristics of the optical disc 200 can be more properly evaluated.

In this way, in the evaluation device shown in FIG. 10, the BCA detector 35 acquires the medium specification information as waveform distortion information for specifying the waveform distortion of the reproduction signal reproduced from the optical disc 200, the medium discriminating circuit 36 changes the gain of the variable waveform equalizer 33 as a parameter used in the signal processing relating to the waveform distortion of the reproduction signal reproduced from the optical disc 200 based on the medium specification information, and the jitter evaluating circuit 34 evaluates the jitter characteristic of the optical disc 200. At this time, the gain of the variable waveform equalizer 33 is increased only by several dB to emphasize high-frequency components of the reproduction signal if the optical disc 200 is a BD with the HtoL characteristic and the on-groove recording. Therefore, the jitter characteristic of the BD with the HtoL characteristic and the on-groove recording can be properly evaluated.

The optical disc 200 evaluated as above is sold in the market and information is recorded on the groove track OG or information recorded on the groove track OG is reproduced by irradiating a laser beam LB to the recording layer 202 via the transparent layer 201 using the optical disc device according to any one of the above first to sixth embodiments. The signal processing relating to the waveform distortion at this time is adjusted by changing the parameter used in the signal processing based on the waveform distortion information for specifying the waveform distortion of the reproduction signal as described above, and the parameter is changed to emphasize the high-frequency components of the reproduction signal more than in a signal processing relating to a waveform distortion of a reproduction signal reproduced from an optical disc in which the reflectance of a recorded area is higher than that of an unrecorded area.

Although the BD with the HtoL characteristic and the on-groove recording is described above, a BD with the HtoL characteristic and the in-groove recording and a BD with the LtoH characteristic and the on-groove recording may be similarly processed.

The present invention is summarized as follows from the above respective embodiments. Specifically, an optical recording medium according to the present invention is an optical recording medium in which information is recorded on a land track or a groove track and the reflectance of a recorded area is lower than that of an unrecorded area, wherein a signal processing relating to a waveform distortion of a reproduction signal reproduced from the optical recording medium is adjusted by changing a parameter used in the signal processing based on waveform distortion information for specifying the waveform distortion of the reproduction signal and the parameter is changed to emphasize high-frequency components of the reproduction signal more than in a signal processing relating to a waveform distortion of a reproduction signal reproduced from an optical recording medium in which the reflectance of a recorded area is higher than that of an unrecorded area.

In this optical recording medium, the parameter used in the signal processing relating to the waveform distortion of the reproduction signal being reproduced is changed to emphasize the high-frequency components of the reproduction signal more than in the signal processing relating to the waveform distortion of the reproduction signal reproduced from the optical recording medium in which the reflectance of the recorded area is higher than that of the unrecorded area. Thus, the quality of a high-frequency signal can be improved and the signal processing relating to the waveform distortion can be satisfactorily performed even to a reproduction signal having a large waveform distortion.

A reproducing/recording device according to the present invention at least either reproduces or records information from or on the above optical recording medium.

Since information is at least reproduced from or recorded on the above optical recording medium in this reproducing/recording device, the signal processing relating to the waveform distortion can be satisfactorily performed even to a reproduction signal having a large waveform distortion.

The optical recording medium is preferably a recordable optical recording medium. In this case, an inorganic recording material can be used for a recording layer and a good reproduction signal can be obtained.

Another optical recording medium according to the present invention is an optical recording medium in which information is recorded on a land track or a groove track and the reflectance of a recorded area is higher than that of an unrecorded area, wherein a signal processing relating to a waveform distortion of a reproduction signal reproduced from the optical recording medium is adjusted by changing a parameter used in the signal processing based on waveform distortion information for specifying the waveform distortion of the reproduction signal and the parameter is changed to reduce the waveform distortion more than in a signal processing relating to a waveform distortion of a reproduction signal reproduced from an optical recording medium in which the reflectance of a recorded area is lower than that of an unrecorded area.

In this optical recording medium, the parameter used in the signal processing relating to the waveform distortion of the reproduction signal being reproduced is changed to reduce the waveform distortion more than in the signal processing relating to the waveform distortion of the reproduction signal reproduced from the optical recording medium in which the reflectance of the recorded area is lower than that of the unrecorded area. Thus, the quality of a high-frequency signal can be improved and the signal processing relating to the waveform distortion can be satisfactorily performed even to a reproduction signal having a large waveform distortion.

Another reproducing/recording device according to the present invention at least either reproduces or records information from or on the above optical recording medium.

Since information is at least reproduced from or recorded on the above optical recording medium in this reproducing/recording device, the signal processing relating to the waveform distortion can be satisfactorily performed even to a reproduction signal having a large waveform distortion.

The optical recording medium is preferably a recordable optical recording medium. In this case, since an organic recording material can be used for a recording layer, a good reproduction signal can be obtained and the optical recording medium can be inexpensively manufactured.

Another optical recording medium according to the present invention is an optical recording medium in which information is recorded on a land track or a groove track, wherein a signal processing relating to a waveform distortion of a reproduction signal reproduced from the optical recording medium is adjusted by changing a parameter used in the signal processing based on waveform distortion information for specifying the waveform distortion of the reproduction signal and the parameter is changed to emphasize high-frequency components of the reproduction signal more in a signal processing relating to a waveform distortion of a reproduction signal reproduced from a first optical recording medium, in which the reflectance of a recorded area is lower than that of an unrecorded area, than in a signal processing relating to a waveform distortion of a reproduction signal reproduced from a second optical recording medium, in which the reflectance of a recorded area is higher than that of an unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium.

In this optical recording medium, the parameter used in the signal processing relating to the waveform distortion of the reproduction signal being reproduced is changed to emphasize the high-frequency components of the reproduction signal more in the signal processing relating to the waveform distortion of the reproduction signal reproduced from the first optical recording medium, in which the reflectance of the recorded area is lower than that of the unrecorded area, than in the signal processing relating to the waveform distortion of the reproduction signal reproduced from the second optical recording medium, in which the reflectance of the recorded area is higher than that of the unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium. Thus, the quality of a high-frequency signal can be improved and the signal processing relating to the waveform distortion can be satisfactorily performed even to a reproduction signal having a large waveform distortion.

The recording density of the first optical recording medium is preferably equal to that of the second optical recording medium. In this case, the parameter used in the signal processing relating to the reproduction signal being reproduced can be changed to the one suitable for the respective characteristics of the first and second optical recording media having the equal recording density.

The recording capacity of the first optical recording medium is preferably equal to that of the second optical recording medium. In this case, the parameter used in the signal processing relating to the reproduction signal being reproduced can be changed to the one suitable for the respective characteristics of the first and second optical recording media having the equal recording capacity.

Another optical recording medium according to the present invention is an optical recording medium in which information is recorded on a land track or a groove track, wherein an area is provided to record medium specification information indicating whether the optical recording medium is a first optical recording medium in which the reflectance of a recorded area is lower than that of an unrecorded area or a second optical recording medium in which the reflectance of a recorded area is higher than that of an unrecorded area is recorded, a signal processing relating to a waveform distortion of a reproduction signal reproduced from the optical recording medium is adjusted by changing a parameter used in the signal processing based on the medium specification information and the parameter is changed to emphasize high-frequency components of the reproduction signal more in a signal processing relating to a waveform distortion of a reproduction signal reproduced from the first optical recording medium than in a signal processing relating to a waveform distortion of a reproduction signal reproduced from the second optical recording medium while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium.

This optical recording medium includes the area for recording the medium specification information indicating whether the optical recording medium is the first optical recording medium in which the reflectance of the recorded area is lower than that of the unrecorded area or the second optical recording medium in which the reflectance of the recorded area is higher than that of the unrecorded area and, based on the medium specification information, the parameter used in the signal processing relating to the waveform distortion of the reproduction signal being reproduced is changed to emphasize the high-frequency components of the reproduction signal more in the signal processing relating to the waveform distortion of the reproduction signal reproduced from the first optical recording medium, in which the reflectance of the recorded area is lower than that of the unrecorded area, than in the signal processing relating to the waveform distortion of the reproduction signal reproduced from the second optical recording medium, in which the reflectance of the recorded area is higher than that of the unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium. Thus, the quality of a high-frequency signal can be improved and the signal processing relating to the waveform distortion can be satisfactorily performed even to a reproduction signal having a large waveform distortion.

At least one of information recorded in a BCA area, information recorded in a PIC area and information recorded using a wobble preferably includes the medium specification information. In this case, since the medium specification information can be included in at least one of the information recorded in the BCA area, the information recorded in the PIC area and the information recorded using the wobble, the parameter can be changed to the one suitable for the respective characteristics of the first and second optical recording media by specifying the types of the optical recording media from the medium specification information.

At least two of the information recorded in the BCA area, the information recorded in the PIC area and the information recorded using the wobble preferably include the medium specification information. In this case, since the medium specification information can be included in at least two of the information recorded in the BCA area, the information recorded in the PIC area and the information recorded using the wobble, the parameter can be changed to the one suitable for the respective characteristics of the first and second optical recording media by reliably specifying the types of the optical recording media from the two pieces of medium specification information.

All of the information recorded in the BCA area, the information recorded in the PIC area and the information recorded using the wobble preferably include the medium specification information. In this case, since the medium specification information can be included in all of the information recorded in the BCA area, the information recorded in the PIC area and the information recorded using the wobble, the parameter can be changed to the one suitable for the respective characteristics of the first and second optical recording media by more reliably specifying the types of the optical recording media from the three pieces of medium specification information.

It is preferable that the optical recording medium is a multilayer optical recording medium including a plurality of recording layers; and that the medium specification information is recorded on each recording layer. In this case, since the medium specification information is recorded on each recording layer, the parameter can be changed to the one suitable for characteristics of the respective recording layers by specifying the types of the respective recording layers.

It is preferable that the optical recording medium is a multilayer optical recording medium including a plurality of recording layers; that a PIC area is provided in one of the plurality of recording layers most distant from a light incident surface; and that the medium specification information is recorded in the PIC area. In this case, since the medium specification information is recorded in the PIC area of the most distant recording layer from the light incident surface, the medium specification information can be easily acquired.

An optical recording medium manufacturing method according to the present invention is an optical recording medium manufacturing method for manufacturing an optical recording medium to which a signal processing relating to a waveform distortion of a reproduction signal is adjusted by changing a parameter based on waveform distortion information for specifying the waveform distortion of the reproduction signal, comprising a first step of forming a groove in a substrate; and a second step of forming a recording layer for recording information on a land track or a groove track specified by the groove, wherein the reflectance of a recorded area is lower than that of an unrecorded area in the recording layer and the parameter is changed to emphasize high-frequency components of the reproduction signal more than in a signal processing relating to a waveform distortion of a reproduction signal reproduced from an optical recording medium in which the reflectance of a recorded area is higher than that of an unrecorded area.

In this optical recording medium manufacturing method, the parameter used in the signal processing relating to the waveform distortion of the reproduction signal being reproduced is changed to emphasize the high-frequency components of the reproduction signal more than in the signal processing relating to the waveform distortion of the reproduction signal reproduced from the optical recording medium in which the reflectance of the recorded area is higher than that of the unrecorded area. Thus, an optical recording medium can be manufactured which can improve the quality of a high-frequency signal and allows the signal processing relating to the waveform distortion to be satisfactorily performed even to a reproduction signal having a large waveform distortion.

Another reproducing/recording device according to the present invention at least either reproduces or records information from or on an optical recording medium manufactured by the above optical recording medium manufacturing method.

Since information is at least reproduced from or recorded on the optical recording medium manufactured by the above optical recording medium manufacturing method in this reproducing/recording device, the signal processing relating to the waveform distortion can be satisfactorily performed even to a reproduction signal having a large waveform distortion.

The optical recording medium is preferably a recordable optical recording medium. In this case, since an inorganic recording material can be used for a recording layer, an optical recording medium capable of obtaining a good reproduction signal can be manufactured.

Another optical recording medium manufacturing method according to the present invention is an optical recording medium manufacturing method for manufacturing an optical recording medium to which a signal processing relating to a waveform distortion of a reproduction signal is adjusted by changing a parameter based on waveform distortion information for specifying the waveform distortion of the reproduction signal, comprising a first step of forming a groove in a substrate; and a second step of forming a recording layer for recording information on a land track or a groove track specified by the groove, wherein the reflectance of a recorded area is higher than that of an unrecorded area in the recording layer and the parameter is changed to reduce the waveform distortion more than in a signal processing relating to a waveform distortion of a reproduction signal reproduced from an optical recording medium in which the reflectance of a recorded area is lower than that of an unrecorded area.

In this optical recording medium manufacturing method, the parameter used in the signal processing relating to the waveform distortion of the reproduction signal being reproduced is changed to reduce the waveform distortion more than in the signal processing relating to the waveform distortion of the reproduction signal reproduced from the optical recording medium in which the reflectance of the recorded area is lower than that of the unrecorded area. Thus, an optical recording medium can be manufactured which can improve the quality of a high-frequency signal and allows the signal processing relating to the waveform distortion to be satisfactorily performed even to a reproduction signal having a large waveform distortion.

Another reproducing/recording device according to the present invention at least either reproduces or records information from or on an optical recording medium manufactured by the above optical recording medium manufacturing method.

Since information is at least reproduced from or recorded on the optical recording medium manufactured by the above optical recording medium manufacturing method in this reproducing/recording device, the signal processing relating to the waveform distortion can be satisfactorily performed even to a reproduction signal having a large waveform distortion.

The optical recording medium is preferably a recordable optical recording medium. In this case, since an organic recording material can be used for a recording layer, an optical recording medium capable of obtaining a good reproduction signal can be inexpensively manufactured.

Another optical recording medium manufacturing method according to the present invention is an optical recording medium manufacturing method for manufacturing an optical recording medium to which a signal processing relating to a waveform distortion of a reproduction signal is adjusted by changing a parameter based on waveform distortion information for specifying the waveform distortion of the reproduction signal, comprising a first step of forming a groove in a substrate; and a second step of forming a recording layer for recording information on a land track or a groove track specified by the groove, wherein the parameter is changed to emphasize high-frequency components of the reproduction signal more in a signal processing relating to a waveform distortion of a reproduction signal reproduced from a first optical recording medium, in which the reflectance of a recorded area is lower than that of an unrecorded area, than in a signal processing relating to a waveform distortion of a reproduction signal reproduced from a second optical recording medium, in which the reflectance of a recorded area is higher than that of an unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium.

In this optical recording medium manufacturing method, the parameter used in the signal processing relating to the waveform distortion of the reproduction signal being reproduced is changed to emphasize the high-frequency components of the reproduction signal more in the signal processing relating to the waveform distortion of the reproduction signal reproduced from the first optical recording medium, in which the reflectance of the recorded area is lower than that of the unrecorded area, than in the signal processing relating to the waveform distortion of the reproduction signal reproduced from the second optical recording medium, in which the reflectance of the recorded area is higher than that of the unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium. Thus, an optical recording medium can be manufactured which can improve the quality of a high-frequency signal and allows the signal processing relating to the waveform distortion to be satisfactorily performed even to a reproduction signal having a large waveform distortion.

The recording density of the first optical recording medium is preferably equal to that of the second optical recording medium. In this case, first and second optical recording media can be manufactured which can change the parameter used in the signal processing relating to the waveform distortion of the reproduction signal being reproduced to the one suitable for the respective characteristics of the first and second optical recording media having the equal recording density.

The recording capacity of the first optical recording medium is preferably equal to that of the second optical recording medium. In this case, first and second optical recording media can be manufactured which can change the parameter used in the signal processing relating to the waveform distortion of the reproduction signal being reproduced to the one suitable for the respective characteristics of the first and second optical recording media having the equal recording capacity.

Another optical recording medium manufacturing method according to the present invention comprises a first step of forming a groove in a substrate; a first step of forming a recording layer for recording information on a land track or a groove track specified by the groove; and a third step of forming an area for recording medium specification information indicating whether an optical recording medium is a first optical recording medium in which the reflectance of a recorded area is lower than that of an unrecorded area or a second optical recording medium in which the reflectance of a recorded area is higher than that of an unrecorded area, wherein a signal processing relating to a waveform distortion of a reproduction signal reproduced from the optical recording medium is adjusted by changing a parameter used in the signal processing based on the medium specification information and the parameter is changed to emphasize high-frequency components of the reproduction signal more in a signal processing relating to a waveform distortion of a reproduction signal reproduced from the first optical recording medium than in a signal processing relating to a waveform distortion of a reproduction signal reproduced from the second optical recording medium while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium.

In this optical recording medium manufacturing method, the medium specification information indicating whether the optical recording medium is the first optical recording medium in which the reflectance of the recorded area is lower than that of the unrecorded area or the second optical recording medium in which the reflectance of the recorded area is higher than that of the unrecorded area is recorded and, based on this medium specification information, the parameter used in the signal processing relating to the waveform distortion of the reproduction signal being reproduced is changed to emphasize the high-frequency components of the reproduction signal more in the signal processing relating to the waveform distortion of the reproduction signal reproduced from the first optical recording medium, in which the reflectance of the recorded area is lower than that of the unrecorded area, than in the signal processing relating to the waveform distortion of the reproduction signal reproduced from the second optical recording medium, in which the reflectance of the recorded area is higher than that of the unrecorded area is recorded, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium. Thus, an optical recording medium can be manufactured which can improve the quality of a high-frequency signal and allows the signal processing relating to the waveform distortion to be satisfactorily performed even to a reproduction signal having a large waveform distortion.

At least one of information recorded in a BCA area, information recorded in a PIC area and information recorded using a wobble preferably includes the medium specification information. In this case, since the medium specification information can be included in at least one of the information recorded in the BCA area, the information recorded in the PIC area and the information recorded using the wobble, first and second optical recording media can be manufactured which can change the parameter to the one suitable for the respective characteristics of the first and second optical recording media by specifying the types of the optical recording media from the medium specification information.

At least two of the information recorded in the BCA area, the information recorded in the PIC area and the information recorded using the wobble preferably include the medium specification information. In this case, since the medium specification information can be included in at least two of the information recorded in the BCA area, the information recorded in the PIC area and the information recorded using the wobble, first and second optical recording media can be manufactured which can change the parameter to the one suitable for the respective characteristics of the first and second optical recording media by reliably specifying the types of the optical recording media from the two pieces of medium specification information.

All of the information recorded in the BCA area, the information recorded in the PIC area and the information recorded using the wobble preferably include the medium specification information. In this case, since the medium specification information can be included in all of the information recorded in the BCA area, the information recorded in the PIC area and the information recorded using the wobble, first and second optical recording media can be manufactured which can change the parameter to the one suitable for the respective characteristics of the first and second optical recording media by more reliably specifying the types of the optical recording media from the three pieces of medium specification information.

It is preferable that the optical recording medium is a multilayer optical recording medium including a plurality of recording layers; and that the medium specification information is recorded on each recording layer. In this case, since the medium specification information is recorded on each recording layer, an optical recording medium can be manufactured which can change the parameter to the one suitable for characteristics of the respective recording layers by specifying the types of the respective recording layers.

It is preferable that the optical recording medium is a multilayer optical recording medium including a plurality of recording layers; that a PIC area is provided in one of the plurality of recording layers most distant from a light incident surface; and that the medium specification information is recorded in the PIC area. In this case, since the medium specification information is recorded in the PIC area of the most distant recording layer from the light incident surface, an optical recording medium can be manufactured which can easily acquire the medium specification information.

A reproduction signal processing method according to the present invention is a reproduction signal processing method for processing a reproduction signal reproduced from an optical recording medium in which information is recorded on a land track or a groove track and the reflectance of a recorded area is lower than that of an unrecorded area, comprising a first step of acquiring waveform distortion information for specifying a waveform distortion of the reproduction signal; and a second step of adjusting a signal processing relating to the waveform distortion of the reproduction signal reproduced from the optical recording medium by changing a parameter used in the signal processing based on the waveform distortion information, wherein the parameter is changed to emphasize high-frequency components of the reproduction signal more than in a signal processing relating to a waveform distortion of a reproduction signal reproduced from an optical recording medium in which the reflectance of a recorded area is higher than that of an unrecorded area.

In this reproduction signal processing method, the parameter used in the signal processing relating to the waveform distortion of the reproduction signal being reproduced is changed to emphasize the high-frequency components of the reproduction signal more than in the signal processing relating to the waveform distortion of the reproduction signal reproduced from the optical recording medium in which the reflectance of the recorded area is higher than that of the unrecorded area. Thus, the quality of a high-frequency signal can be improved and the signal processing relating to the waveform distortion can be satisfactorily performed even to a reproduction signal having a large waveform distortion.

Another reproducing/recording device according to the present invention at least either reproduces or records information from or on an optical recording medium to be processed by the above reproduction signal processing method.

Since information is at least reproduced from or recorded on the optical recording medium to be processed by the above reproduction signal processing method in this reproducing/recording device, the signal processing relating to the waveform distortion can be satisfactorily performed even to a reproduction signal having a large waveform distortion.

The optical recording medium is preferably a recordable optical recording medium. In this case, since an inorganic recording material can be used for a recording layer, a good reproduction signal can be obtained.

Another reproduction signal processing method according to the present invention is a reproduction signal processing method for processing a reproduction signal reproduced from an optical recording medium in which information is recorded on a land track or a groove track and the reflectance of a recorded area is higher than that of an unrecorded area, comprising a first step of acquiring waveform distortion information for specifying a waveform distortion of the reproduction signal; and a second step of adjusting a signal processing relating to the waveform distortion of the reproduction signal reproduced from the optical recording medium by changing a parameter used in the signal processing based on the waveform distortion information, wherein the parameter is changed to reduce the waveform distortion more than in a signal processing relating to a waveform distortion of a reproduction signal reproduced from an optical recording medium in which the reflectance of a recorded area is lower than that of an unrecorded area.

In this reproduction signal processing method, the parameter used in the signal processing relating to the waveform distortion of the reproduction signal being reproduced is changed to reduce the waveform distortion more than in the signal processing relating to the waveform distortion of the reproduction signal reproduced from the optical recording medium in which the reflectance of the recorded area is lower than that of the unrecorded area. Thus, the quality of a high-frequency signal can be improved and the signal processing relating to the waveform distortion can be satisfactorily performed even to a reproduction signal having a large waveform distortion.

Another reproducing/recording device according to the present invention at least either reproduces or records information from or on an optical recording medium to be processed by the above reproduction signal processing method.

Since information is at least reproduced from or recorded on the optical recording medium to be processed by the above reproduction signal processing method in this reproducing/recording device, the signal processing relating to the waveform distortion can be satisfactorily performed even to a reproduction signal having a large waveform distortion.

The optical recording medium is preferably a recordable optical recording medium. In this case, since an organic recording material can be used for a recording layer, an optical recording medium capable of obtaining a good reproduction signal can be inexpensively manufactured.

Another reproduction signal processing method according to the present invention is a reproduction signal processing method for processing a reproduction signal reproduced from an optical recording medium in which information is recorded on a land track or a groove track, comprising a first step of acquiring waveform distortion information for specifying a waveform distortion of the reproduction signal; and a second step of adjusting a signal processing relating to the waveform distortion of the reproduction signal reproduced from the optical recording medium by changing a parameter used in the signal processing based on the waveform distortion information, wherein the parameter is changed to emphasize high-frequency components of the reproduction signal more in a signal processing relating to a waveform distortion of a reproduction signal reproduced from a first optical recording medium, in which the reflectance of a recorded area is lower than that of an unrecorded area, than in a signal processing relating to a waveform distortion of a reproduction signal reproduced from a second optical recording medium, in which the reflectance of a recorded area is higher than that of an unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium.

In this reproduction signal processing method, the parameter used in the signal processing relating to the waveform distortion of the reproduction signal being reproduced is changed to emphasize the high-frequency components of the reproduction signal more in the signal processing relating to the waveform distortion of the reproduction signal reproduced from the first optical recording medium, in which the reflectance of the recorded area is lower than that of the unrecorded area, than in the signal processing relating to the waveform distortion of the reproduction signal reproduced from the second optical recording medium, in which the reflectance of the recorded area is higher than that of the unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium. Thus, the quality of a high-frequency signal can be improved and the signal processing relating to the waveform distortion can be satisfactorily performed even to a reproduction signal having a large waveform distortion.

The recording density of the first optical recording medium is preferably equal to that of the second optical recording medium. In this case, the parameter used in the signal processing relating to the waveform distortion of the reproduction signal being reproduced can be changed to the one suitable for the respective characteristics of the first and second optical recording media having the equal recording density.

The recording capacity of the first optical recording medium is preferably equal to that of the second optical recording medium. In this case, the parameter used in the signal processing relating to the reproduction signal being reproduced can be changed to the one suitable for the respective characteristics of the first and second optical recording media having the equal recording capacity.

Another reproduction signal processing method according to the present invention is a reproduction signal processing method for processing a reproduction signal reproduced from an optical recording medium in which information is recorded on a land track or a groove track, comprising a first step of acquiring medium specification information indicating whether the optical recording medium is a first optical recording medium in which the reflectance of a recorded area is lower than that of an unrecorded area or a second optical recording medium in which the reflectance of a recorded area is higher than that of an unrecorded area; and a second step of adjusting a signal processing relating to a waveform distortion of the reproduction signal reproduced from the optical recording medium by changing a parameter used in the signal processing based on the medium specification information, wherein the parameter is changed to emphasize high-frequency components of the reproduction signal more in a signal processing relating to a waveform distortion of a reproduction signal reproduced from the first optical recording medium, in which the reflectance of a recorded area is lower than that of an unrecorded area, than in a signal processing relating to a waveform distortion of a reproduction signal reproduced from the second optical recording medium, in which the reflectance of a recorded area is higher than that of an unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium.

In this reproduction signal processing method, the medium specification information indicating whether the optical recording medium is the first optical recording medium in which the reflectance of the recorded area is lower than that of the unrecorded area or the second optical recording medium in which the reflectance of the recorded area is higher than that of the unrecorded area is acquired and, based on this medium specification information, the parameter used in the signal processing relating to the waveform distortion of the reproduction signal being reproduced is changed to emphasize the high-frequency components of the reproduction signal more in the signal processing relating to the waveform distortion of the reproduction signal reproduced from the first optical recording medium, in which the reflectance of the recorded area is lower than that of the unrecorded area, than in the signal processing relating to the waveform distortion of the reproduction signal reproduced from the second optical recording medium, in which the reflectance of the recorded area is higher than that of the unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium. Thus, the quality of a high-frequency signal can be improved and the signal processing relating to the waveform distortion can be satisfactorily performed even to a reproduction signal having a large waveform distortion.

At least one of information recorded in a BCA area, information recorded in a PIC area and information recorded using a wobble preferably includes the medium specification information. In this case, since the medium specification information can be included in at least one of the information recorded in the BCA area, the information recorded in the PIC area and the information recorded using the wobble, the parameter can be changed to the one suitable for the respective characteristics of the first and second optical recording media by specifying the types of the optical recording media from the medium specification information.

At least two of the information recorded in the BCA area, the information recorded in the PIC area and the information recorded using the wobble preferably include the medium specification information. In this case, since the medium specification information can be included in at least two of the information recorded in the BCA area, the information recorded in the PIC area and the information recorded using the wobble, the parameter can be changed to the one suitable for the respective characteristics of the first and second optical recording media by reliably specifying the types of the optical recording media from the two pieces of medium specification information.

All of the information recorded in the BCA area, the information recorded in the PIC area and the information recorded using the wobble preferably include the medium specification information. In this case, since the medium specification information can be included in all of the information recorded in the BCA area, the information recorded in the PIC area and the information recorded using the wobble, the parameter can be changed to the one suitable for the respective characteristics of the first and second optical recording media by more reliably specifying the types of the optical recording media from the three pieces of medium specification information.

It is preferable that the optical recording medium is a multilayer optical recording medium including a plurality of recording layers; and that the medium specification information is recorded on each recording layer. In this case, since the medium specification information is recorded on each recording layer, the parameter can be changed to the one suitable for characteristics of the respective recording layers by specifying the types of the respective recording layers.

It is preferable that the optical recording medium is a multilayer optical recording medium including a plurality of recording layers; that a PIC area is provided in one of the plurality of recording layers most distant from a light incident surface; and that the medium specification information is recorded in the PIC area. In this case, since the medium specification information is recorded in the PIC area of the most distant recording layer from the light incident surface, the medium specification information can be easily acquired.

An evaluation method according to the present invention is an evaluation method for evaluating an optical recording medium in which information is recorded on a land track or a groove track and the reflectance of a recorded area is lower than that of an unrecorded area, comprising a first step of acquiring waveform distortion information for specifying a waveform distortion of a reproduction signal reproduced from the optical recording medium; and a second step of evaluating the optical recording medium by changing a parameter used in a signal processing relating to the waveform distortion of the reproduction signal reproduced from the optical recording medium based on the waveform distortion information, wherein the parameter is changed to emphasize high-frequency components of the reproduction signal more than in a signal processing relating to a waveform distortion of a reproduction signal reproduced from an optical recording medium in which the reflectance of a recorded area is higher than that of an unrecorded area.

In this evaluation method, the parameter used in the signal processing relating to the waveform distortion of the reproduction signal being reproduced is changed to emphasize the high-frequency components of the reproduction signal more than in the signal processing relating to the waveform distortion of the reproduction signal reproduced from the optical recording medium in which the reflectance of the recorded area is higher than that of the unrecorded area. Thus, the quality of a high-frequency signal can be improved. As a result, the signal processing relating to the waveform distortion can be satisfactorily performed even to a reproduction signal having a large waveform distortion, wherefore characteristics of an optical recording medium can be precisely evaluated.

Another reproducing/recording device according to the present invention at least either reproduces or records information from or on an optical recording medium to be evaluated by the above evaluation method.

Since information is at least reproduced from or recorded on the optical recording medium to be evaluated by the above evaluation method in this reproducing/recording device, the signal processing relating to the waveform distortion can be satisfactorily performed even to a reproduction signal having a large waveform distortion.

The optical recording medium is preferably a recordable optical recording medium. In this case, since an inorganic recording material can be used for a recording layer, a good reproduction signal can be obtained.

Another evaluation method according to the present invention is an evaluation method for evaluating an optical recording medium in which information is recorded on a land track or a groove track and the reflectance of a recorded area is higher than that of an unrecorded area, comprising a first step of acquiring waveform distortion information for specifying a waveform distortion of a reproduction signal reproduced from the optical recording medium; and a second step of evaluating the optical recording medium by changing a parameter used in a signal processing relating to the waveform distortion of the reproduction signal reproduced from the optical recording medium based on the waveform distortion information, wherein the parameter is changed to reduce the waveform distortion more than in a signal processing relating to a waveform distortion of a reproduction signal reproduced from an optical recording medium in which the reflectance of a recorded area is lower than that of an unrecorded area.

In this evaluation method, the parameter used in the signal processing relating to the waveform distortion of the reproduction signal being reproduced is changed to reduce the waveform distortion more than in the signal processing relating to the waveform distortion of the reproduction signal reproduced from the optical recording medium in which the reflectance of the recorded area is lower than that of the unrecorded area. Thus, the quality of a high-frequency signal can be improved. As a result, the signal processing relating to the waveform distortion can be satisfactorily performed even to a reproduction signal having a large waveform distortion, wherefore characteristics of an optical recording medium can be precisely evaluated.

Another reproducing/recording device according to the present invention at least either reproduces or records information from or on an optical recording medium to be evaluated by the above evaluation method.

Since information is at least reproduced from or recorded on the optical recording medium to be evaluated by the above evaluation method in this reproducing/recording device, the signal processing relating to the waveform distortion can be satisfactorily performed even to a reproduction signal having a large waveform distortion.

The optical recording medium is preferably a recordable optical recording medium. In this case, since an organic recording material can be used for a recording layer, an optical recording medium capable of obtaining a good reproduction signal can be inexpensively manufactured.

Another evaluation method according to the present invention is an evaluation method for evaluating an optical recording medium in which information is recorded on a land track or a groove track, comprising a first step of acquiring waveform distortion information for specifying a waveform distortion of a reproduction signal reproduced from the optical recording medium; and a second step of evaluating the optical recording medium by changing a parameter used in a signal processing relating to the waveform distortion of the reproduction signal reproduced from the optical recording medium based on the waveform distortion information, wherein the parameter is changed to emphasize high-frequency components of the reproduction signal more in a signal processing relating to a waveform distortion of a reproduction signal reproduced from a first optical recording medium, in which the reflectance of a recorded area is lower than that of an unrecorded area, than in a signal processing relating to a waveform distortion of a reproduction signal reproduced from a second optical recording medium, in which the reflectance of a recorded area is higher than that of an unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium.

In this evaluation method, the parameter used in the signal processing relating to the waveform distortion of the reproduction signal being reproduced is changed to emphasize the high-frequency components of the reproduction signal more in the signal processing relating to the waveform distortion of the reproduction signal reproduced from the first optical recording medium, in which the reflectance of the recorded area is lower than that of the unrecorded area, than in the signal processing relating to the waveform distortion of the reproduction signal reproduced from the second optical recording medium, in which the reflectance of the recorded area is higher than that of the unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium. Thus, the quality of a high-frequency signal can be improved. As a result, the signal processing relating to the waveform distortion can be satisfactorily performed even to a reproduction signal having a large waveform distortion, wherefore characteristics of an optical recording medium can be precisely evaluated.

The recording density of the first optical recording medium is preferably equal to that of the second optical recording medium. In this case, the parameter used in the signal processing relating to the waveform distortion of the reproduction signal being reproduced can be changed to the one suitable for the respective characteristics of the first and second optical recording media having the equal recording density.

The recording capacity of the first optical recording medium is preferably equal to that of the second optical recording medium. In this case, the parameter used in the signal processing relating to the reproduction signal being reproduced can be changed to the one suitable for the respective characteristics of the first and second optical recording media having the equal recording capacity.

Another evaluation method according to the present invention is an evaluation method for evaluating an optical recording medium in which information is recorded on a land track or a groove track, comprising a first step of acquiring medium specification information indicating whether the optical recording medium is a first optical recording medium in which the reflectance of a recorded area is lower than that of an unrecorded area or a second optical recording medium in which the reflectance of a recorded area is higher than that of an unrecorded area; and a second step of evaluating the optical recording medium by changing a parameter used in a signal processing relating to a waveform distortion of a reproduction signal reproduced from the optical recording medium based on the medium specification information, wherein the parameter is changed to emphasize high-frequency components of the reproduction signal more in a signal processing relating to a waveform distortion of a reproduction signal reproduced from the first optical recording medium, in which the reflectance of the recorded area is lower than that of the unrecorded area, than in a signal processing relating to a waveform distortion of a reproduction signal reproduced from the second optical recording medium, in which the reflectance of the recorded area is higher than that of the unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium.

In this reproduction signal processing method, the medium specification information indicating whether the optical recording medium is the first optical recording medium in which the reflectance of the recorded area is lower than that of the unrecorded area or the second optical recording medium in which the reflectance of the recorded area is higher than that of the unrecorded area is acquired and, based on this medium specification information, the parameter used in the signal processing relating to the waveform distortion of the reproduction signal being reproduced is changed to emphasize the high-frequency components of the reproduction signal more in the signal processing relating to the waveform distortion of the reproduction signal reproduced from the first optical recording medium, in which the reflectance of the recorded area is lower than that of the unrecorded area, than in the signal processing relating to the waveform distortion of the reproduction signal reproduced from the second optical recording medium, in which the reflectance of the recorded area is higher than that of the unrecorded area, while being changed to reduce the waveform distortion more in the signal processing relating to the waveform distortion of the reproduction signal reproduced from the second optical recording medium than in the signal processing relating to the waveform distortion of the reproduction signal reproduced from the first optical recording medium. Thus, the quality of a high-frequency signal can be improved. As a result, the signal processing relating to the waveform distortion can be satisfactorily performed even to a reproduction signal having a large waveform distortion, wherefore characteristics of an optical recording medium can be precisely evaluated.

At least one of information recorded in a BCA area, information recorded in a PIC area and information recorded using a wobble preferably includes the medium specification information. In this case, since the medium specification information can be included in at least one of the information recorded in the BCA area, the information recorded in the PIC area and the information recorded using the wobble, the parameter can be changed to the one suitable for the respective characteristics of the first and second optical recording media by specifying the types of the optical recording media from the medium specification information.

At least two of the information recorded in the BCA area, the information recorded in the PIC area and the information recorded using the wobble preferably include the medium specification information. In this case, since the medium specification information can be included in at least two of the information recorded in the BCA area, the information recorded in the PIC area and the information recorded using the wobble, the parameter can be changed to the one suitable for the respective characteristics of the first and second optical recording media by reliably specifying the types of the optical recording media from the two pieces of medium specification information.

All of the information recorded in the BCA area, the information recorded in the PIC area and the information recorded using the wobble preferably include the medium specification information. In this case, since the medium specification information can be included in all of the information recorded in the BCA area, the information recorded in the PIC area and the information recorded using the wobble, the parameter can be changed to the one suitable for the respective characteristics of the first and second optical recording media by more reliably specifying the types of the optical recording media from the three pieces of medium specification information.

It is preferable that the optical recording medium is a multilayer optical recording medium including a plurality of recording layers; and that the medium specification information is recorded on each recording layer. In this case, since the medium specification information is recorded on each recording layer, the parameter can be changed to the one suitable for characteristics of the respective recording layers by specifying the types of the respective recording layers.

It is preferable that the optical recording medium is a multilayer optical recording medium including a plurality of recording layers; that a PIC area is provided in one of the plurality of recording layers most distant from a light incident surface; and that the medium specification information is recorded in the PIC area. In this case, since the medium specification information is recorded in the PIC area of the most distant recording layer from the light incident surface, the medium specification information can be easily acquired.

Another reproduction signal processing method according to the present invention comprises a first step of acquiring waveform distortion information for specifying a waveform distortion of a reproduction signal reproduced from an optical recording medium; and a second step for performing a distortion reduction processing for reducing the waveform distortion of the reproduction signal by changing a parameter used in the distortion reduction processing.

In this reproduction signal processing method, the waveform distortion information for specifying the waveform distortion of the reproduction signal reproduced from the optical recording medium is acquired and the distortion reduction processing for reducing the waveform distortion of the reproduction signal is performed by changing the parameter used in the distortion reduction processing based on this waveform distortion information. Thus, stable reproduction quality can be obtained without being influenced by recording quality even if a PRML signal processing is performed to a reproduction signal having a large waveform distortion.

It is preferable that the first step includes a step of acquiring, as the waveform distortion information, medium specification information indicating that the optical recording medium, from which information is being reproduced, is an optical recording medium in which the reflectance of a recorded area is higher than that of an unrecorded area and information is recorded on a land track; and that the second step includes a step of changing the parameter to reduce the waveform distortion of the reproduction signal if the medium specification information was acquired.

In this case, if the optical recording medium is the one in which the reflectance of the recorded area is higher than that of the unrecorded area and information is recorded on the land track, the distortion reduction processing for reducing the waveform distortion of the reproduction signal is performed by changing the parameter used in the distortion reduction processing. Thus, even if a PRML signal processing is performed to a reproduction signal having a large waveform distortion from an optical recording medium in which the reflectance of a recorded area is higher than that of an unrecorded area and information is recorded on a land track, stable reproduction quality can be obtained without being influenced by recording quality.

It is preferable that the first step includes a step of detecting the waveform distortion of the reproduction signal reproduced from the optical recording medium; and that the second step includes a step of changing the parameter to reduce the waveform distortion of the reproduction signal according to the waveform distortion.

In this case, the waveform distortion of the reproduction signal reproduced from the optical recording medium is detected and the distortion reduction processing is performed by changing the parameter used in the distortion reduction processing for reducing the waveform distortion of the reproduction signal according to the detected waveform distortion. Thus, even if a PRML signal processing is performed to a reproduction signal having a large waveform distortion, stable reproduction quality can be obtained without being influenced by recording quality.

It is preferable that the second step includes a third step of performing a waveform equalization processing to the reproduction signal and a fourth step of performing a PRML signal processing to the reproduction signal after the waveform equalization processing; and that the third step includes a step of reducing a gain used in the waveform equalization processing based on the waveform distortion information.

In this case, the gain used in the waveform equalization processing is reduced based on the waveform distortion information, and the PRML signal processing is performed to the reproduction signal after the waveform equalization processing using this gain. Thus, even if the PRML signal processing is performed to a reproduction signal having a large waveform distortion from an optical recording medium with poor recording quality, stable reproduction quality can be obtained without being influenced by recording quality.

It is preferable that the second step includes a third step of performing a waveform equalization processing to the reproduction signal and a fourth step of performing a PRML signal processing to the reproduction signal after the waveform equalization processing; and that the fourth step includes a step of changing a class used in the PRML signal processing from a high-frequency range emphasizing class to a high-frequency range non-emphasizing class based on the waveform distortion information.

In this case, the class used in the PRML signal processing is changed from the high-frequency range emphasizing class to the high-frequency range non-emphasizing class based on the waveform distortion information. Thus, even if the PRML signal processing is performed to a reproduction signal having a large waveform distortion, stable reproduction quality can be obtained without being influenced by recording quality.

It is preferable that the second step includes a third step of performing a waveform equalization processing to the reproduction signal and a fourth step of performing a PRML signal processing to the reproduction signal after the waveform equalization processing; and that the fourth step includes a step of performing a level judgment processing to a reproduction signal having a mark length equal to or longer than a specified length based on the waveform distortion information while performing the PRML signal processing to a reproduction signal having a mark length shorter than the specified length.

In this case, based on the waveform distortion information, the level judgment processing is performed to the reproduction signal having the mark length equal to or longer than the specified length, whereas the PRML signal processing is performed to the reproduction signal having the mark length shorter than the specified length. Thus, the PRML signal processing is performed only to reproduction signals having short mark lengths out of reproduction signals having large waveform distortions from an optical recording medium with poor recording quality and stable reproduction quality can be obtained without being influenced by recording quality.

It is preferable that the second step includes a third step of performing a waveform equalization processing to the reproduction signal and a fourth step of performing a PRML signal processing to the reproduction signal after the waveform equalization processing; and that the fourth step includes a step of performing a low-pass filter processing to a reproduction signal having a waveform equal to or higher than a specified level while performing the PRML signal processing to the reproduction signal after the low-pass filter processing.

In this case, based on the waveform distortion information, the low-pass filter processing is performed to the reproduction signal having the waveform equal to or higher than the specified level while the PRML signal processing is performed to the reproduction signal after the low-pass filter processing. Thus, even if the PRML signal processing is performed to a reproduction signal having a large waveform distortion from an optical recording medium with poor recording quality, stable reproduction quality can be obtained without being influenced by recording quality.

It is preferable that the second step includes a fifth step of performing an automatic gain control processing for automatically adjusting an amplitude gain of the reproduction signal and a sixth step of converting the reproduction signal after the automatic gain control processing from an analog signal into a digital signal and performing a specified digital signal processing to the digital reproduction signal; and that the fifth step includes a step of increasing a target gain used in the automatic gain control processing based on the waveform distortion information such that the reproduction signal after the automatic gain control processing exceeds a dynamic range in the digital signal processing.

In this case, the target gain used in the automatic gain control processing is increased based on the waveform distortion information such that the reproduction signal after the automatic gain control processing exceeds the dynamic range in the digital signal processing. Thus, a large waveform distortion of the reproduction signal can be removed by the dynamic range in the digital signal processing, and stable reproduction quality can be obtained without being influenced by recording quality even if the PRML signal processing is performed to a reproduction signal having a large waveform distortion from an optical recording medium with poor recording quality.

A reproduction signal processing circuit according to the present invention comprises an acquiring unit for acquiring waveform distortion information for specifying a waveform distortion of a reproduction signal reproduced from an optical recording medium; and a distortion reducing unit for performing a distortion reduction processing for reducing the waveform distortion of the reproduction signal by changing a parameter used in the distortion reduction processing based on the waveform distortion information.

A reproduction signal processing program according to the present invention causes a computer to function as an acquiring unit for acquiring waveform distortion information for specifying a waveform distortion of a reproduction signal reproduced from an optical recording medium and as a distortion reducing unit for performing a distortion reduction processing for reducing the waveform distortion of the reproduction signal by changing a parameter used in the distortion reduction processing based on the waveform distortion information.

An information reproducing device according to the present invention comprises an optical head for reproducing information recorded on an optical recording medium; an acquiring unit for acquiring waveform distortion information for specifying a waveform distortion of a reproduction signal reproduced by the optical head; and a distortion reducing unit for performing a distortion reduction processing for reducing the waveform distortion of the reproduction signal by changing a parameter used in the distortion reduction processing based on the waveform distortion information.

INDUSTRIAL APPLICABILITY

An optical recording medium and the like according to the present invention are useful as an optical recording medium and the like, to which a signal processing relating to a waveform distortion of a reproduction signal is to be performed, since the signal processing relating to the waveform distortion of the reproduction signal can be satisfactorily performed even to a reproduction signal having a large waveform distortion.

What is claimed is:

1. An optical recording medium comprising:
a land track or a groove track having information recorded thereon, wherein:
a waveform equalization processing of a reproduction signal reproduced from the optical recording medium is adjusted by changing a gain used in the waveform equalization processing based on waveform distortion information for specifying a waveform distortion of the reproduction signal; and
the gain is (i) increased to emphasize high-frequency components of the reproduction signal more in a waveform equalization processing of a reproduction signal reproduced from a first optical recording medium, in which a reflectance of a recorded area of the first optical recording medium is lower than a reflectance of an unrecorded area of the first optical recording medium, than in a waveform equalization processing of a reproduction signal reproduced from a second optical recording medium, in which a reflectance of a recorded area of the second optical recording medium is higher than a reflectance of an unrecorded area of the second optical recording medium, and (ii) decreased to reduce the waveform distortion of the reproduction signal more in the waveform equalization processing of the reproduction signal reproduced from the second optical recording medium than in the waveform equalization processing of the reproduction signal reproduced from the first optical recording medium.

2. An optical recording medium comprising:
a land tack or a groove track having information recorded thereon;
a recorded area;
an unrecorded area; and
an area for recording medium specification information indicating whether the optical recording medium is a first optical recording medium in which a reflectance of the recorded area is lower than a reflectance of the unrecorded area or a second optical recording medium in which the reflectance the recorded area is higher than the reflectance of the unrecorded area, wherein:
a waveform equalization processing of a reproduction signal reproduced from the optical recording medium is adjusted by changing a gain used in the waveform equalization processing based on the medium specification information; and
the gain is (i) increased to emphasize high-frequency components of the reproduction signal more in a waveform equalization processing of a reproduction signal reproduced from the first optical recording medium than in a waveform equalization processing of a reproduction signal reproduced from the second optical recording medium and (ii) decreased to reduce a waveform distortion more in the waveform equalization processing of the reproduction signal reproduced from the second optical recording medium than in the waveform equalization processing of the reproduction signal reproduced from the first optical recording medium.

3. An optical recording medium manufacturing method for manufacturing an optical recording medium to which a waveform equalization processing of a reproduction signal is adjusted by changing a gain based on waveform distortion information for specifying a waveform distortion of the reproduction signal, the optical recording medium manufacturing method comprising:

a first step of forming a groove in a substrate; and a second step of forming a recording layer for recording information on a land track or a groove track specified by the groove, wherein the gain is (i) increased to emphasize high-frequency components of the reproduction signal more in a waveform equalization processing of a reproduction signal reproduced from a first optical recording medium, in which a reflectance of a recorded area of the first optical recording medium is lower than a reflectance of an unrecorded area of the first optical recording medium, than in a waveform equalization processing of a reproduction signal reproduced from a second optical recording medium, in which a reflectance of a recorded area of the second optical recording medium is higher than a reflectance of an unrecorded area of the second optical recording medium, and (ii) decreased to reduce the waveform distortion more in the waveform equalization processing of the reproduction signal reproduced from the second optical recording medium than in the waveform equalization processing of the reproduction signal reproduced from the first optical recording medium.

4. An optical recording medium manufacturing method of manufacturing an optical recording medium, the optical recording medium manufacturing method comprising:

a first step of forming a groove in a substrate;

a second step of forming a recording layer for recording information on a land track or a groove track specified by the groove; and a third step of forming an area for recording medium specification information indicating whether the optical recording medium is a first optical recording medium in which a reflectance of a recorded area of the first optical recording medium is lower than a reflectance of an unrecorded area of the first optical recording medium or a second optical recording medium in which a reflectance of a recorded area of the second optical recording medium is higher than a reflectance of an unrecorded area of the second optical recording medium, wherein:

a waveform equalization processing of a reproduction signal reproduced from the optical recording medium is adjusted by changing a gain used in the waveform equalization processing based on the medium specification information; and the gain is (i) increased to emphasize high-frequency components of the reproduction signal more in a waveform equalization processing of a reproduction signal reproduced from the first optical recording medium than in a waveform equalization processing of a reproduction signal reproduced from the second optical recording medium, and (ii) decreased to reduce a waveform distortion more in the waveform equalization processing of the reproduction signal reproduced from the second optical recording medium than in the waveform equalization processing of the reproduction signal reproduced from the first optical recording medium.

5. An evaluation method for evaluating an optical recording medium in which information is recorded on a land track or a groove track, the evaluation method comprising:

a first step of acquiring waveform distortion information for specifying a waveform distortion of a reproduction signal reproduced from the optical recording medium; and a second step of evaluating the optical recording medium by changing a gain used in a waveform equalization processing of the reproduction signal reproduced from the optical recording medium based on the waveform distortion information, wherein the gain is (i) increased to emphasize high-frequency components of the reproduction signal more in a waveform equalization processing of a reproduction signal reproduced from a first optical recording medium, in which a reflectance of a recorded area of the first optical recording medium is lower than a reflectance of an unrecorded area of the first optical recording medium, than in a waveform equalization processing of a reproduction signal reproduced from a second optical recording medium, in which a reflectance of a recorded area of the second optical recording medium is higher than a reflectance of an unrecorded area of the second optical recording medium, and (ii) decreased to reduce the waveform distortion more in the waveform equalization processing of the reproduction signal reproduced from the second optical recording medium than in the waveform equalization processing of the reproduction signal reproduced from the first optical recording medium.

6. An evaluation method for evaluating an optical recording medium in which information is recorded on a land track or a groove track, the evaluation method comprising:

a first step of acquiring medium specification information indicating whether the optical recording medium is a first optical recording medium in which a reflectance of a recorded area of the first optical recording medium is lower than a reflectance of an unrecorded area of the first optical recording medium or a second optical recording medium in which a reflectance of a recorded area of the second optical recording medium is higher than a reflectance of an unrecorded area of the second optical recording medium; and a second step of evaluating the optical recording medium by changing a gain used in a waveform equalization processing of a reproduction signal reproduced from the optical recording medium based on the medium specification information, wherein the gain is (i) increased to emphasize high-frequency components of the reproduction signal more in a waveform equalization processing of a reproduction signal reproduced from the first optical recording medium, in which the reflectance of the recorded area is lower than the reflectance the unrecorded area, than in a waveform equalization processing of a reproduction signal reproduced from the second optical recording medium, in which the reflectance of the recorded area is higher than the reflectance of the unrecorded area, and (ii) decreased to reduce a waveform distortion more in the waveform equalization processing of the reproduction signal reproduced from the second optical recording medium than in the waveform equalization processing of the reproduction signal reproduced from the first optical recording medium.

* * * * *